US012788001B2

(12) United States Patent
Kremesec et al.

(10) Patent No.: US 12,788,001 B2
(45) Date of Patent: Nov. 10, 2026

(54) AUTOMATED AGRICULTURE IMPLEMENT

(71) Applicant: FarmWise Labs, Inc., Santa Clara, CA (US)

(72) Inventors: Garrick Kremesec, Santa Clara, CA (US); Thomas Palomares, Santa Clara, CA (US); Christian Carlberg, Santa Clara, CA (US); Aaron Shearer, Santa Clara, CA (US); Sean Wooster, Santa Clara, CA (US); Damien Berget, Santa Clara, CA (US)

(73) Assignee: FarmWise Labs, Inc., Santa Clara, CA (US)

( * ) Notice: Subject to any disclaimer, the term of this patent is extended or adjusted under 35 U.S.C. 154(b) by 0 days.

(21) Appl. No.: 18/435,924

(22) Filed: Feb. 7, 2024

(65) Prior Publication Data

US 2024/0260562 A1 Aug. 8, 2024

Related U.S. Application Data

(60) Provisional application No. 63/463,255, filed on May 1, 2023, provisional application No. 63/443,925, filed on Feb. 7, 2023.

(51) Int. Cl.

| | |
|---|---|
| ***A01M 7/00*** | (2006.01) |
| ***A01B 39/18*** | (2006.01) |
| ***A01B 63/16*** | (2006.01) |

(52) U.S. Cl.

CPC ........... *A01M 7/0089* (2013.01); *A01B 39/18* (2013.01); *A01B 63/163* (2013.01)

(58) Field of Classification Search

CPC ........................... A01M 7/0089; A01B 63/163

See application file for complete search history.

(56) References Cited

U.S. PATENT DOCUMENTS

| | | | |
|---|---|---|---|
| 4,182,101 | A | 1/1980 | Gaeddert et al. |
| 4,413,685 | A | 11/1983 | Gremelspacher et al. |
| 4,674,403 | A | 6/1987 | Bryant et al. |
| 4,721,168 | A | 1/1988 | Kinzenbaw |

(Continued)

FOREIGN PATENT DOCUMENTS

| | | | |
|---|---|---|---|
| AU | 2013295763 | B2 | 10/2017 |
| AU | 2018216246 | B2 | 8/2022 |

(Continued)

OTHER PUBLICATIONS

JP-2021136919-A machine translation (Year: 2021).*

(Continued)

*Primary Examiner* — Frederick M Brushaber

(74) *Attorney, Agent, or Firm* — Jeffrey Schox; Diana Lin

(57) ABSTRACT

The system can include: an implement frame and a set of modular assemblies. The system can optionally include a vehicle and a set of effectors. However, the system can additionally or alternatively include any other suitable set of components. The system can function to facilitate automated and/or perception-based weeding and/or other automated agricultural operations. Additionally, the system can function to collect plant-level data on crops during implement operation. However, the system can additionally or alternatively be configured to provide any other suitable functionality.

20 Claims, 34 Drawing Sheets

(56) References Cited

U.S. PATENT DOCUMENTS

| | | | | |
|---|---|---|---|---|
| 4,868,752 | A * | 9/1989 | Fujii | G05D 1/0246 701/28 |
| 5,272,859 | A | 12/1993 | Pruitt et al. | |
| 5,350,020 | A * | 9/1994 | Vandever | A01D 31/02 56/2 |
| D360,862 | S | 8/1995 | McClain et al. | |
| 5,442,552 | A | 8/1995 | Slaughter et al. | |
| 5,540,288 | A | 7/1996 | Dietrich, Sr. | |
| 5,625,776 | A | 4/1997 | Johnson | |
| 5,842,428 | A | 12/1998 | Stufflebeam et al. | |
| 5,884,464 | A | 3/1999 | McMillen | |
| 5,924,269 | A | 7/1999 | McMillen | |
| 5,946,896 | A | 9/1999 | Daniels | |
| 5,974,348 | A | 10/1999 | Rocks | |
| 6,109,193 | A | 8/2000 | Crabb et al. | |
| 6,442,485 | B2 | 8/2002 | Evans | |
| 6,523,333 | B2 | 2/2003 | Metzger | |
| 6,819,780 | B2 | 11/2004 | Benson et al. | |
| 7,032,369 | B1 | 4/2006 | Eaton et al. | |
| 7,272,713 | B1 | 9/2007 | Tester | |
| 7,606,739 | B1 | 10/2009 | Johnson | |
| 8,191,795 | B2 | 6/2012 | Grimm et al. | |
| 8,523,085 | B2 | 9/2013 | Grimm et al. | |
| 8,540,159 | B2 | 9/2013 | Lee et al. | |
| 8,606,503 | B2 | 12/2013 | Rothschild | |
| 9,030,549 | B2 | 5/2015 | Redden | |
| 9,064,173 | B2 | 6/2015 | Redden | |
| 9,119,388 | B2 | 9/2015 | Jens | |
| 9,144,189 | B2 | 9/2015 | Stoller et al. | |
| 9,265,187 | B2 | 2/2016 | Cavender-Bares et al. | |
| 9,288,937 | B2 | 3/2016 | Sauder et al. | |
| 9,288,938 | B2 | 3/2016 | Cavender-Bares et al. | |
| 9,332,689 | B2 | 5/2016 | Baurer et al. | |
| 9,339,023 | B2 | 5/2016 | Ballu | |
| 9,392,743 | B2 | 7/2016 | Camacho-Cook et al. | |
| 9,420,748 | B2 | 8/2016 | Chan et al. | |
| 9,578,799 | B2 | 2/2017 | Allgaier et al. | |
| 9,658,201 | B2 | 5/2017 | Redden et al. | |
| 9,717,171 | B2 | 8/2017 | Redden et al. | |
| 9,750,174 | B2 | 9/2017 | Sauder et al. | |
| 9,756,771 | B2 | 9/2017 | Redden | |
| 9,801,322 | B2 | 10/2017 | Sauder et al. | |
| 9,943,027 | B2 | 4/2018 | Sauder et al. | |
| 10,008,035 | B1 | 6/2018 | Redden et al. | |
| 10,098,273 | B2 | 10/2018 | Redden et al. | |
| 10,175,362 | B2 | 1/2019 | Redden et al. | |
| 10,219,431 | B2 | 3/2019 | Stoller et al. | |
| 10,219,449 | B2 | 3/2019 | Redden | |
| 10,231,376 | B1 | 3/2019 | Stanhope et al. | |
| 10,255,670 | B1 * | 4/2019 | Wu | H04N 7/183 |
| 10,262,413 | B2 | 4/2019 | Strnad et al. | |
| 10,278,333 | B2 | 5/2019 | Shen et al. | |
| 10,327,393 | B2 | 6/2019 | Redden et al. | |
| 10,390,481 | B1 | 8/2019 | Brown et al. | |
| 10,390,497 | B2 | 8/2019 | Redden | |
| 10,448,571 | B1 | 10/2019 | McFarland et al. | |
| 10,455,755 | B2 | 10/2019 | Stanhope | |
| 10,491,879 | B2 | 11/2019 | Redden | |
| 10,524,402 | B2 | 1/2020 | Redden | |
| 10,537,071 | B2 | 1/2020 | Redden | |
| 10,548,306 | B2 | 2/2020 | Albert et al. | |
| 10,617,071 | B2 | 4/2020 | Redden et al. | |
| 10,624,269 | B1 | 4/2020 | Linde | |
| 10,679,056 | B2 | 6/2020 | Zemenchik | |
| 10,681,861 | B2 | 6/2020 | Morgan et al. | |
| 10,681,862 | B2 | 6/2020 | Stoller et al. | |
| 10,681,871 | B1 | 6/2020 | Fay | |
| 10,681,905 | B2 | 6/2020 | Tanner et al. | |
| 10,703,277 | B1 | 7/2020 | Schroeder | |
| 10,713,484 | B2 | 7/2020 | Polzounov et al. | |
| 10,719,709 | B2 | 7/2020 | Zemenchik | |
| 10,761,211 | B2 | 9/2020 | Redden et al. | |
| 10,769,845 | B2 | 9/2020 | Redden et al. | |
| 10,785,905 | B2 | 9/2020 | Stoller et al. | |
| 10,806,074 | B2 | 10/2020 | Zemenchik | |
| 10,812,776 | B2 | 10/2020 | Redden | |
| 10,813,272 | B2 * | 10/2020 | Stanhope | A01B 49/027 |
| 10,814,887 | B1 | 10/2020 | Sutton | |
| 10,845,810 | B2 | 11/2020 | Flajolet et al. | |
| D921,056 | S | 6/2021 | Vallat | |
| 11,030,804 | B2 | 6/2021 | Redden et al. | |
| 11,058,042 | B2 | 7/2021 | Redden | |
| 11,071,293 | B2 | 7/2021 | Brown et al. | |
| 11,071,991 | B2 | 7/2021 | Serrat et al. | |
| 11,085,156 | B2 | 8/2021 | Serrat et al. | |
| 11,093,745 | B2 | 8/2021 | Redden et al. | |
| 11,109,585 | B2 | 9/2021 | Serrat et al. | |
| 11,125,568 | B2 | 9/2021 | Opitsch et al. | |
| 11,129,343 | B2 | 9/2021 | Redden et al. | |
| 11,160,269 | B2 | 11/2021 | Brown et al. | |
| 11,178,809 | B1 | 11/2021 | Brown et al. | |
| 11,197,409 | B2 | 12/2021 | Redden et al. | |
| 11,237,563 | B2 | 2/2022 | Javault et al. | |
| 11,350,622 | B2 | 6/2022 | Redden | |
| 11,393,049 | B2 | 7/2022 | Khait et al. | |
| 11,553,636 | B1 * | 1/2023 | Palomares | G06V 10/764 |
| 11,919,636 | B2 | 3/2024 | Clark et al. | |
| 2003/0187560 | A1 | 10/2003 | Keller et al. | |
| 2006/0213167 | A1 | 9/2006 | Koselka et al. | |
| 2014/0021267 | A1 | 1/2014 | Sudduth et al. | |
| 2014/0168412 | A1 | 6/2014 | Shulman et al. | |
| 2014/0180549 | A1 | 6/2014 | Siemens et al. | |
| 2014/0360811 | A1 * | 12/2014 | Ross, Jr. | B66F 11/044 180/9.42 |
| 2015/0075067 | A1 | 3/2015 | Stowe et al. | |
| 2016/0150729 | A1 | 6/2016 | Moore | |
| 2016/0157429 | A1 | 6/2016 | Pitzer et al. | |
| 2016/0224703 | A1 | 8/2016 | Shriver | |
| 2017/0034986 | A1 | 2/2017 | Koch et al. | |
| 2017/0049044 | A1 | 2/2017 | Stoller et al. | |
| 2017/0161560 | A1 | 6/2017 | Itzhaky et al. | |
| 2017/0206415 | A1 | 7/2017 | Redden | |
| 2017/0219711 | A1 | 8/2017 | Redden et al. | |
| 2017/0223947 | A1 | 8/2017 | Gall et al. | |
| 2017/0345398 | A1 | 11/2017 | Fuchs et al. | |
| 2017/0359943 | A1 | 12/2017 | Calleija et al. | |
| 2018/0114305 | A1 | 4/2018 | Strnad et al. | |
| 2018/0128933 | A1 | 5/2018 | Koch et al. | |
| 2018/0139947 | A1 | 5/2018 | Albert et al. | |
| 2018/0153084 | A1 | 6/2018 | Calleija et al. | |
| 2018/0184581 | A1 | 7/2018 | Morgan et al. | |
| 2018/0238823 | A1 | 8/2018 | Puhalla et al. | |
| 2018/0242517 | A1 | 8/2018 | Davis et al. | |
| 2018/0243772 | A1 | 8/2018 | Davis et al. | |
| 2018/0279556 | A1 | 10/2018 | Briquet-Kerestedjian et al. | |
| 2018/0295783 | A1 | 10/2018 | Alexander et al. | |
| 2018/0325019 | A1 | 11/2018 | Connell et al. | |
| 2019/0032305 | A1 | 1/2019 | Hageman et al. | |
| 2019/0050948 | A1 | 2/2019 | Perry et al. | |
| 2019/0059206 | A1 | 2/2019 | Stanhope et al. | |
| 2019/0064363 | A1 | 2/2019 | Redden et al. | |
| 2019/0098848 | A1 | 4/2019 | Qin | |
| 2019/0104722 | A1 | 4/2019 | Slaughter et al. | |
| 2019/0110394 | A1 | 4/2019 | Vannahmen | |
| 2019/0150357 | A1 | 5/2019 | Wu et al. | |
| 2019/0239502 | A1 | 8/2019 | Palomares et al. | |
| 2019/0285422 | A1 | 9/2019 | Opitsch et al. | |
| 2019/0289767 | A1 * | 9/2019 | Gulotta | A01C 5/064 |
| 2019/0311198 | A1 | 10/2019 | Zemenchik | |
| 2020/0000081 | A1 | 1/2020 | Palomares et al. | |
| 2020/0011019 | A1 | 1/2020 | Serrat et al. | |
| 2020/0015408 | A1 | 1/2020 | Armstead | |
| 2020/0019777 | A1 | 1/2020 | Gurzoni et al. | |
| 2020/0029490 | A1 | 1/2020 | Bertucci et al. | |
| 2020/0045953 | A1 | 2/2020 | Serrat et al. | |
| 2020/0049635 | A1 | 2/2020 | Couture et al. | |
| 2020/0057443 | A1 | 2/2020 | Silver et al. | |
| 2020/0068783 | A1 | 3/2020 | Strnad et al. | |
| 2020/0084965 | A1 | 3/2020 | Neitemeier et al. | |
| 2020/0107490 | A1 | 4/2020 | Zemenchik | |
| 2020/0196535 | A1 | 6/2020 | Dagondon et al. | |
| 2020/0214203 | A1 | 7/2020 | Young et al. | |
| 2020/0214215 | A1 | 7/2020 | Kemmerer et al. | |
| 2020/0221624 | A1 | 7/2020 | Turner et al. | |

(56) References Cited

U.S. PATENT DOCUMENTS

| | | | | |
|---|---|---|---|---|
| 2020/0221628 | A1 | 7/2020 | Blunier et al. | |
| 2020/0221630 | A1 | 7/2020 | Pomedli | |
| 2020/0221638 | A1 | 7/2020 | Engel et al. | |
| 2020/0221651 | A1 | 7/2020 | Klingler et al. | |
| 2020/0221681 | A1 | 7/2020 | Schwaderer et al. | |
| 2020/0230633 | A1 | 7/2020 | Serrat et al. | |
| 2020/0236838 | A1 | 7/2020 | Smith | |
| 2020/0236841 | A1 | 7/2020 | Thompson | |
| 2020/0242754 | A1 | 7/2020 | Peters | |
| 2020/0249217 | A1 | 8/2020 | Stanhope et al. | |
| 2020/0282969 | A1 | 9/2020 | Manji | |
| 2020/0296875 | A1 | 9/2020 | Calleija et al. | |
| 2020/0296885 | A1 | 9/2020 | Stoller et al. | |
| 2020/0302170 | A1 | 9/2020 | Polzounov et al. | |
| 2020/0340203 | A1 | 10/2020 | Torii | |
| 2020/0352086 | A1 | 11/2020 | Stoller et al. | |
| 2020/0352098 | A1 | 11/2020 | Fujii et al. | |
| 2020/0355829 | A1 | 11/2020 | Redden et al. | |
| 2020/0359565 | A1 | 11/2020 | Yamada et al. | |
| 2020/0367430 | A1 | 11/2020 | Ito et al. | |
| 2020/0367431 | A1 | 11/2020 | Ito et al. | |
| 2020/0375094 | A1 | 12/2020 | Calleija et al. | |
| 2020/0383268 | A1 | 12/2020 | Fujii et al. | |
| 2021/0000006 | A1 | 1/2021 | Ellaboudy et al. | |
| 2021/0022282 | A1 | 1/2021 | Wallach et al. | |
| 2021/0031624 | A1 | 2/2021 | Ishikawa et al. | |
| 2021/0034057 | A1 | 2/2021 | Flajolet et al. | |
| 2021/0037695 | A1 | 2/2021 | Strnad et al. | |
| 2021/0051839 | A1 | 2/2021 | Strnad et al. | |
| 2021/0058603 | A1 | 2/2021 | Redden | |
| 2021/0080972 | A1 | 3/2021 | Iwami et al. | |
| 2021/0105995 | A1* | 4/2021 | Palomares | A01B 39/18 |
| 2021/0137015 | A1 | 5/2021 | Ibuki et al. | |
| 2021/0149406 | A1* | 5/2021 | Javault | A01C 21/005 |
| 2021/0161059 | A1 | 6/2021 | Kaufmann | |
| 2021/0192180 | A1 | 6/2021 | Wang et al. | |
| 2021/0243933 | A1 | 8/2021 | Antle et al. | |
| 2021/0243937 | A1* | 8/2021 | Antle | A01B 71/02 |
| 2021/0243940 | A1 | 8/2021 | Snyder et al. | |
| 2021/0248690 | A1 | 8/2021 | Colgan et al. | |
| 2021/0250526 | A1 | 8/2021 | Germain | |
| 2021/0307227 | A1 | 10/2021 | Redden | |
| 2021/0325346 | A1 | 10/2021 | Khait et al. | |
| 2021/0327133 | A1 | 10/2021 | Redden et al. | |
| 2021/0378187 | A1 | 12/2021 | Redden et al. | |
| 2021/0406540 | A1 | 12/2021 | Redden et al. | |
| 2022/0007631 | A1 | 1/2022 | Brown et al. | |
| 2022/0022360 | A1 | 1/2022 | Redden | |
| 2022/0053689 | A1 | 2/2022 | Brown et al. | |
| 2022/0071192 | A1 | 3/2022 | Benoit-Levy et al. | |
| 2022/0076065 | A1 | 3/2022 | Benoit-Levy et al. | |
| 2022/0087094 | A1 | 3/2022 | Redden et al. | |
| 2022/0092705 | A1 | 3/2022 | Khait et al. | |
| 2022/0142142 | A1 | 5/2022 | Van Alphen | |
| 2022/0148100 | A1 | 5/2022 | Khait et al. | |
| 2022/0174933 | A1 | 6/2022 | Smith | |
| 2022/0174934 | A1 | 6/2022 | Germain | |
| 2022/0256832 | A1 | 8/2022 | Serrat et al. | |
| 2022/0311273 | A1 | 9/2022 | Field et al. | |
| 2022/0327183 | A1 | 10/2022 | Russo et al. | |
| 2022/0394912 | A1 | 12/2022 | Barklund | |
| 2023/0043631 | A1* | 2/2023 | Sandbrook | A01B 39/18 |
| 2023/0413798 | A1 | 12/2023 | Sibley et al. | |
| 2024/0032450 | A1* | 2/2024 | Herlitzius | A01B 79/005 |

FOREIGN PATENT DOCUMENTS

| | | | | | |
|---|---|---|---|---|---|
| BR | 112019016157 | A2 | | 3/2020 | |
| BR | 112019016644 | A2 | | 3/2020 | |
| BR | 112019016111 | A2 | | 4/2020 | |
| BR | 112022000718 | A2 | | 3/2022 | |
| CA | 3050364 | A1 | | 8/2018 | |
| CA | 3052114 | A1 | | 8/2018 | |
| CA | 3054649 | A1 | | 8/2018 | |
| CA | 3147000 | A1 | | 1/2021 | |
| CA | 3146705 | A1 | | 3/2021 | |
| CN | 106912331 | A | | 7/2017 | |
| CN | 107846848 | A | | 3/2018 | |
| CN | 110150260 | A | * | 8/2019 | |
| CN | 110520896 | A | | 11/2019 | |
| CN | 113597874 | A | | 11/2021 | |
| DE | 102017204650 | A1 | | 9/2018 | |
| DE | 102019218177 | A1 | | 5/2021 | |
| DE | 102019218182 | A1 | | 5/2021 | |
| DE | 102019218186 | A1 | | 5/2021 | |
| DE | 102019218187 | A1 | | 5/2021 | |
| DE | 102019218188 | A1 | | 5/2021 | |
| DE | 102019218192 | A1 | | 5/2021 | |
| DE | 202017007481 | U1 | | 12/2021 | |
| DK | 3316673 | T3 | | 12/2020 | |
| EP | 3323300 | A1 | | 5/2018 | |
| EP | 3355675 | A1 | | 8/2018 | |
| EP | 3357332 | A1 | | 8/2018 | |
| EP | 3358525 | A1 | | 8/2018 | |
| EP | 3323300 | B1 | | 6/2019 | |
| EP | 3576526 | A1 | | 12/2019 | |
| EP | 3577628 | A1 | | 12/2019 | |
| EP | 3585168 | A1 | | 1/2020 | |
| EP | 3666622 | A1 | | 6/2020 | |
| EP | 3667555 | A1 | | 6/2020 | |
| EP | 3682201 | A1 | | 7/2020 | |
| EP | 3358525 | B1 | | 9/2020 | |
| EP | 3316673 | B1 | | 11/2020 | |
| EP | 3585168 | B1 | | 3/2021 | |
| EP | 3830662 | A1 | | 6/2021 | |
| EP | 3922099 | A1 | | 12/2021 | |
| EP | 3937628 | A1 | | 1/2022 | |
| EP | 3357332 | B1 | | 4/2022 | |
| EP | 3998843 | A1 | | 5/2022 | |
| EP | 4021655 | A1 | | 7/2022 | |
| EP | 4040953 | A1 | | 8/2022 | |
| ES | 2846786 | T3 | | 7/2021 | |
| FR | 3058616 | A1 | | 5/2018 | |
| FR | 3063206 | A1 | | 8/2018 | |
| FR | 3058616 | B1 | | 12/2018 | |
| FR | 3071124 | A1 | | 3/2019 | |
| FR | 3071124 | B1 | | 9/2019 | |
| FR | 3093613 | A1 | | 9/2020 | |
| FR | 3093614 | A1 | | 9/2020 | |
| FR | 3098684 | A1 | | 1/2021 | |
| FR | 3098962 | A1 | | 1/2021 | |
| FR | 3063206 | B1 | | 8/2021 | |
| FR | 3100140 | B1 | | 9/2021 | |
| FR | 3110743 | A1 | | 11/2021 | |
| FR | 3098962 | B1 | | 12/2021 | |
| FR | 3110743 | B1 | | 4/2022 | |
| GB | 2096874 | A | | 10/1982 | |
| JP | 2013059296 | A | | 4/2013 | |
| JP | 2020510771 | A | | 4/2020 | |
| JP | 6737535 | B2 | | 7/2020 | |
| JP | 2021136919 | A | * | 9/2021 | A01D 34/008 |
| JP | 7110236 | B2 | | 7/2022 | |
| KR | 20190126060 | A | | 11/2019 | |
| KR | 102566841 | B1 | * | 1/2023 | |
| MX | 2019009306 | A | | 12/2019 | |
| WO | 2018141995 | A1 | | 8/2018 | |
| WO | 2018142371 | A1 | | 8/2018 | |
| WO | 2018154490 | A1 | | 8/2018 | |
| WO | 2019053364 | A1 | | 3/2019 | |
| WO | 2020039434 | A1 | | 2/2020 | |
| WO | 2020120802 | A1 | | 6/2020 | |
| WO | 2020120804 | A1 | | 6/2020 | |
| WO | 2020182840 | A1 | | 9/2020 | |
| WO | 2021009710 | A1 | | 1/2021 | |
| WO | 2021037417 | A1 | | 3/2021 | |
| WO | 2021055485 | A1 | | 3/2021 | |
| WO | 2021069980 | A1 | | 4/2021 | |
| WO | 2021090294 | A1 | | 5/2021 | |
| WO | 2021105006 | A1 | | 6/2021 | |
| WO | 2021105014 | A1 | | 6/2021 | |
| WO | 2021105015 | A1 | | 6/2021 | |
| WO | 2021105017 | A1 | | 6/2021 | |
| WO | 2021144785 | A1 | | 7/2021 | |
| WO | 2021159123 | A1 | | 8/2021 | |

(56) References Cited

FOREIGN PATENT DOCUMENTS

| | | | |
|---|---|---|---|
| WO | 2021159124 | A1 | 8/2021 |
| WO | 2021159125 | A1 | 8/2021 |
| WO | 2021234063 | A1 | 11/2021 |
| WO | 2022064482 | A1 | 3/2022 |
| WO | 2022137217 | A1 | 6/2022 |
| WO | 2022172274 | A1 | 8/2022 |

OTHER PUBLICATIONS

Translation of CN110150260A (Year: 2024).*
Translation of KR102566841B1 (Year: 2024).*
"Precision Farming", Novalto, Oct. 13, 2001.
Kremesec, Garrick, et al., "Crop Detection System and/or Method", U.S. Appl. No. 18/435,730, filed Feb. 7, 2024.

* cited by examiner

84" 8 line (9" Y spacing)

42” 3 line (8” Y spacing)

42" 3 line (8" Y spacing)

80” 6 line (10” Y spacing)

80” 5 line (12” Y spacing)

40” 2 line (12” Y spacing)

76” 3 line (20” Y spacing)

AUTOMATED AGRICULTURE IMPLEMENT

CROSS-REFERENCE TO RELATED APPLICATIONS

This application claims the benefit of U.S. Provisional Application No. 63/463,255, filed 1 May 2023, and U.S. Provisional Application No. 63/443,925, filed 7 Feb. 2023, each of which is incorporated in its entirety by this reference.

This application is related to U.S. application Ser. No. 18/435,730, filed 7 Feb. 2024, titled "CROP DETECTION SYSTEM AND/OR METHOD", which is incorporated herein in its entirety by this reference.

TECHNICAL FIELD

This invention relates generally to the agriculture automation field, and more specifically to a new and useful agriculture implement in the agriculture automation field.

DESCRIPTION OF THE PREFERRED EMBODIMENTS

Figure 1:
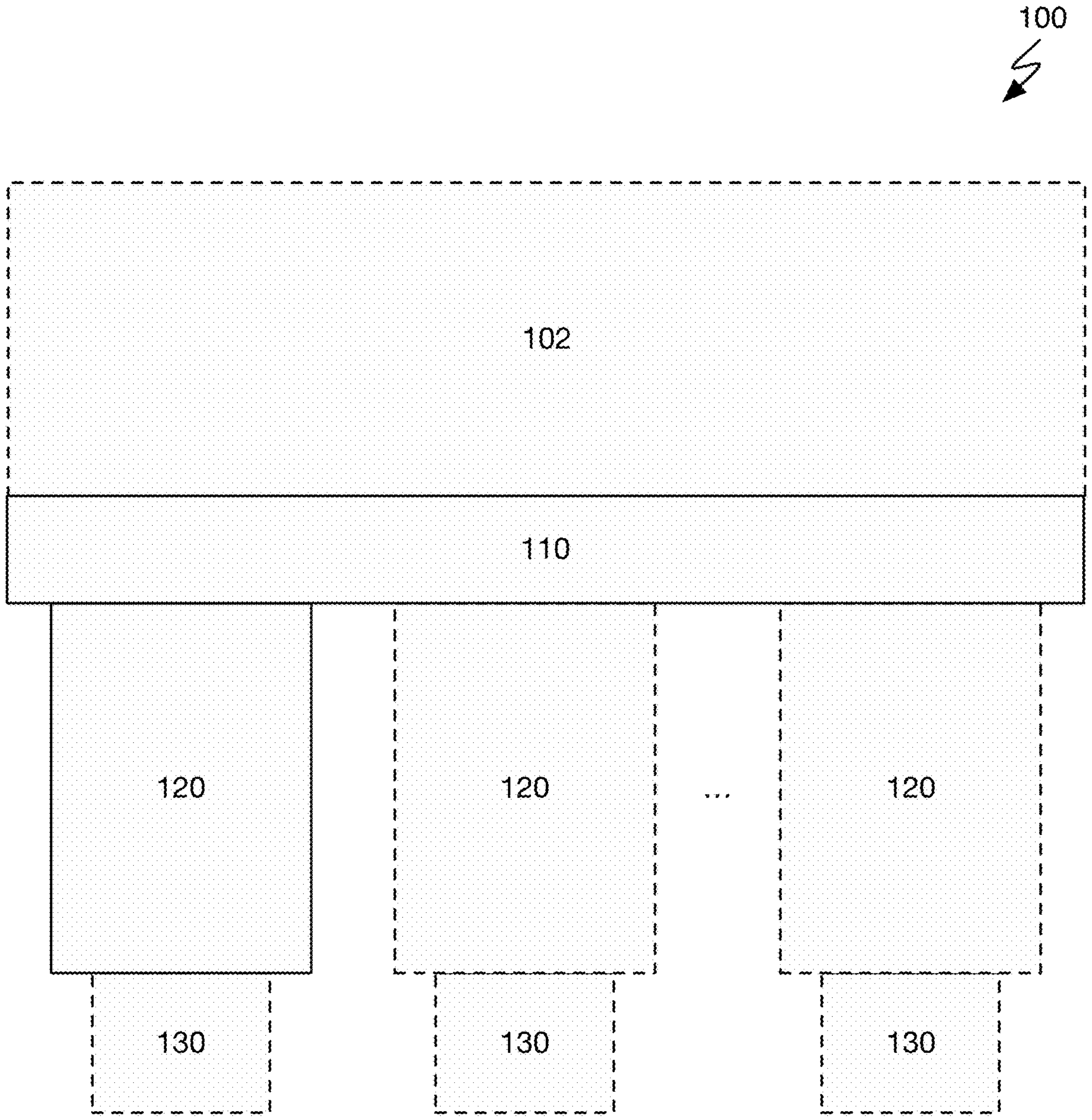
FIG. 1 is a schematic representation of a variant of the system.

The following description of the preferred embodiments of the invention is not intended to limit the invention to these preferred embodiments, but rather to enable any person skilled in the art to make and use this invention.

1. Overview

The system 100 can include: an implement frame and a set of modular assemblies. The system can optionally include a vehicle and a set of effectors. However, the system 100 can additionally or alternatively include any other suitable set of components. The system can function to facilitate automated and/or perception-based weeding and/or other automated agricultural operations. Additionally, the system can function to collect plant-level data on crops during implement operation. However, the system can additionally or alternatively be configured to provide any other suitable functionality.

The term "implement" as utilized herein, in the context of agricultural machinery, weeding systems, or otherwise, can refer to a farm implement, agriculture implement, and/or other suitable implement(s), and these terms may be interchangeably referenced herein. For example, the implement may be a pushed and/or pulled by a vehicle (e.g., a tractor) to facilitate one or more agricultural operations (e.g., weeding, crop data collection, pesticide/herbicide spraying, harvesting, etc.), and/or can be otherwise operated. Similarly, the term "modular assembly" may be suitably referenced herein as a "weeder", "weeder module," and/or "weeding module," such as in variants where the effector and/or perception/control systems are configured for a weeding context. However, it is understood that the modular (implement) assembly may be likewise configured to perform various agricultural operations (e.g., weeding, crop data collection, pesticide/herbicide spraying, harvesting, etc.) and may operate in conjunction with various effectors and/or without an effector (e.g., to perform crop data collection).

Variants of the system can be configured to (autonomously) perform and/or facilitate agriculture operations which can include: agent dispersal (e.g., solid agent dispersal), fluid spraying, crop imaging (e.g., crop data collection), side dressing, weeding (e.g., mechanical actuation, targeted laser ablation, etc.), harvesting, planting, tilling, fertilizing, irrigating, and/or any other suitable operation(s).

Variants of the system and/or method can be used to facilitate detection and/or agriculture operations for single crops, multi-crops (e.g., crop doubles, where agriculture operations may be based on stem proximity), ground cover plants, weeds, and/or agriculture operations in any other suitable scenarios.

In variants, the system can include and/or be configured to operate with the crop detection system(s) and/or any of the system/method elements as described in U.S. application Ser. No. 18/435,730, filed 7 Feb. 2024, titled "CROP DETECTION SYSTEM AND/OR METHOD", which is incorporated herein in its entirety by this reference.

The term "substantially" as utilized herein can mean: exactly, approximately, within a predetermined threshold or tolerance, and/or can have any other suitable meaning.

1.1 Illustrative Examples

Figure 2:
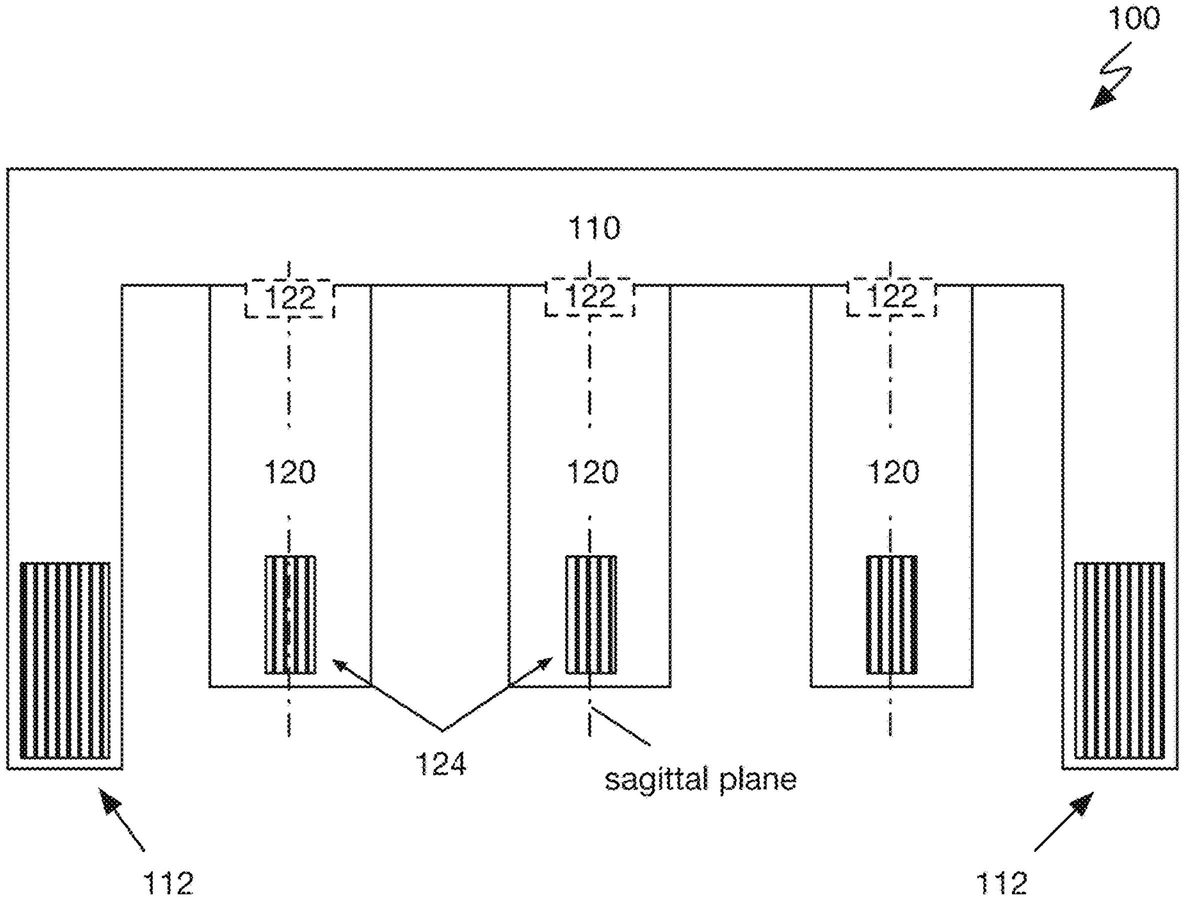
FIG. 2 is a schematic representation of an implement in a variant of the system.
Figure 4:
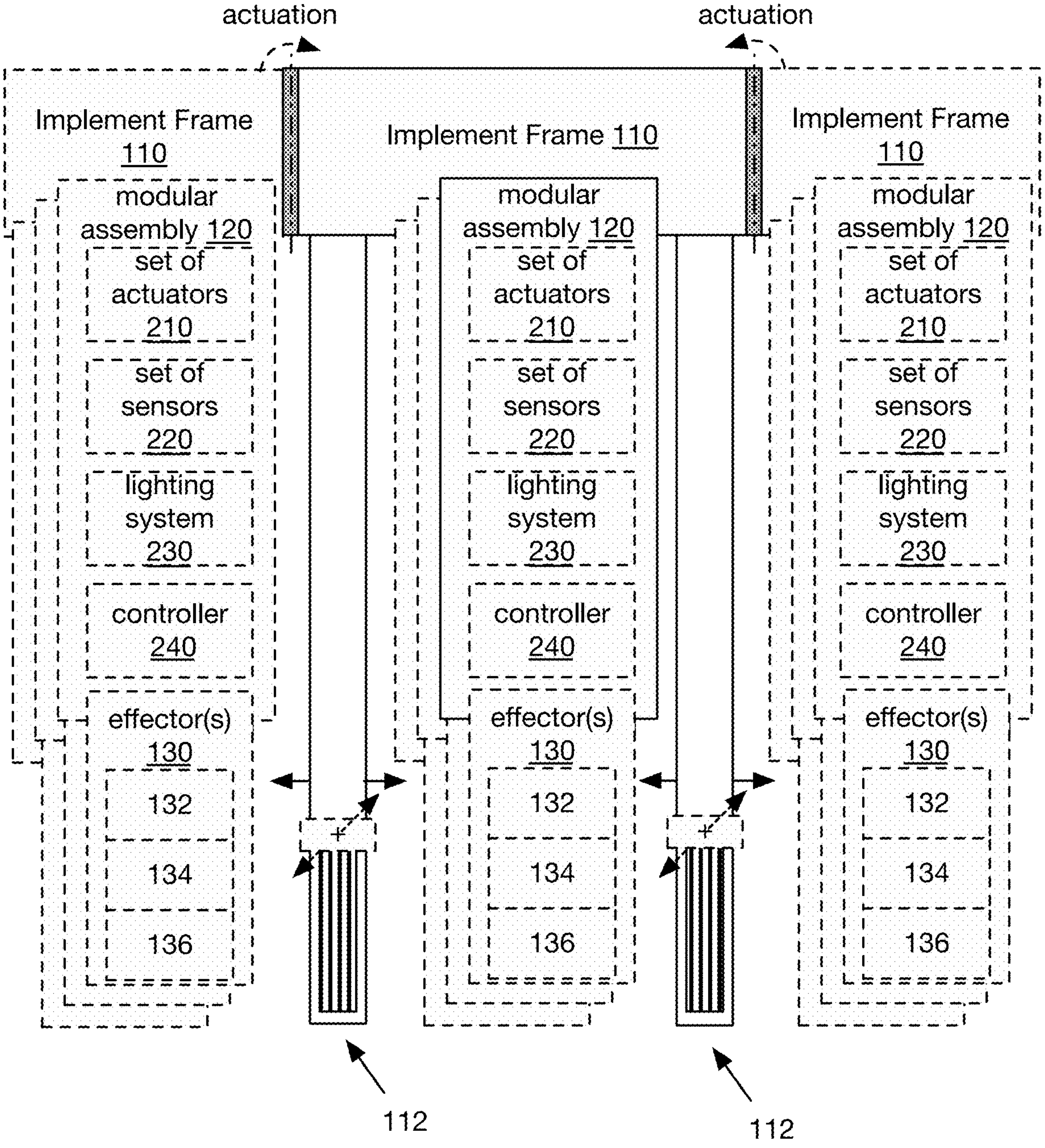
FIG. 4 is a schematic representation of a variant of the system.
Figure 9:
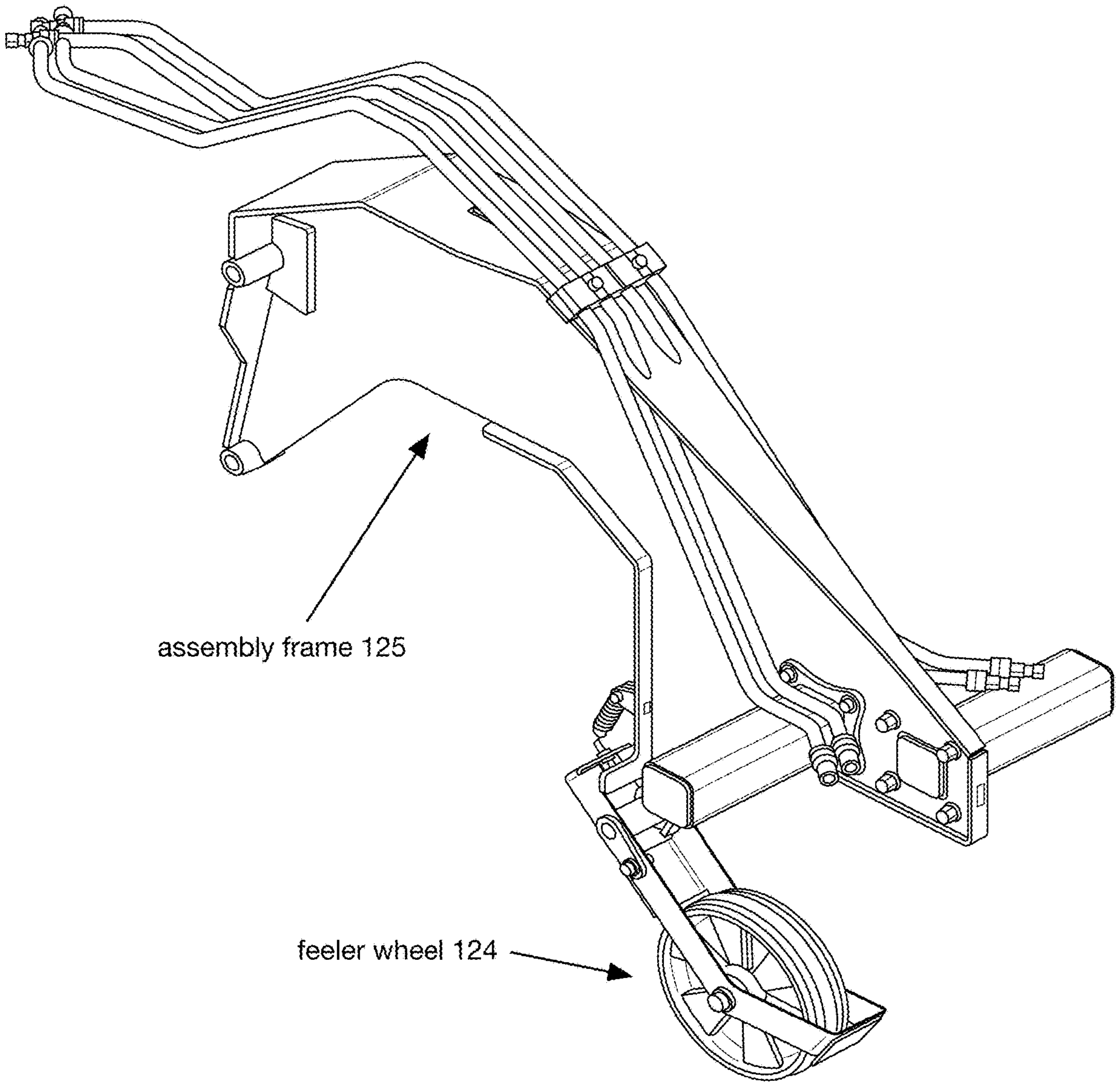
FIG. 9 is a trimetric view of an example of a frame with a feeler wheel in one or more variants of a modular assembly.
Figure 15A:
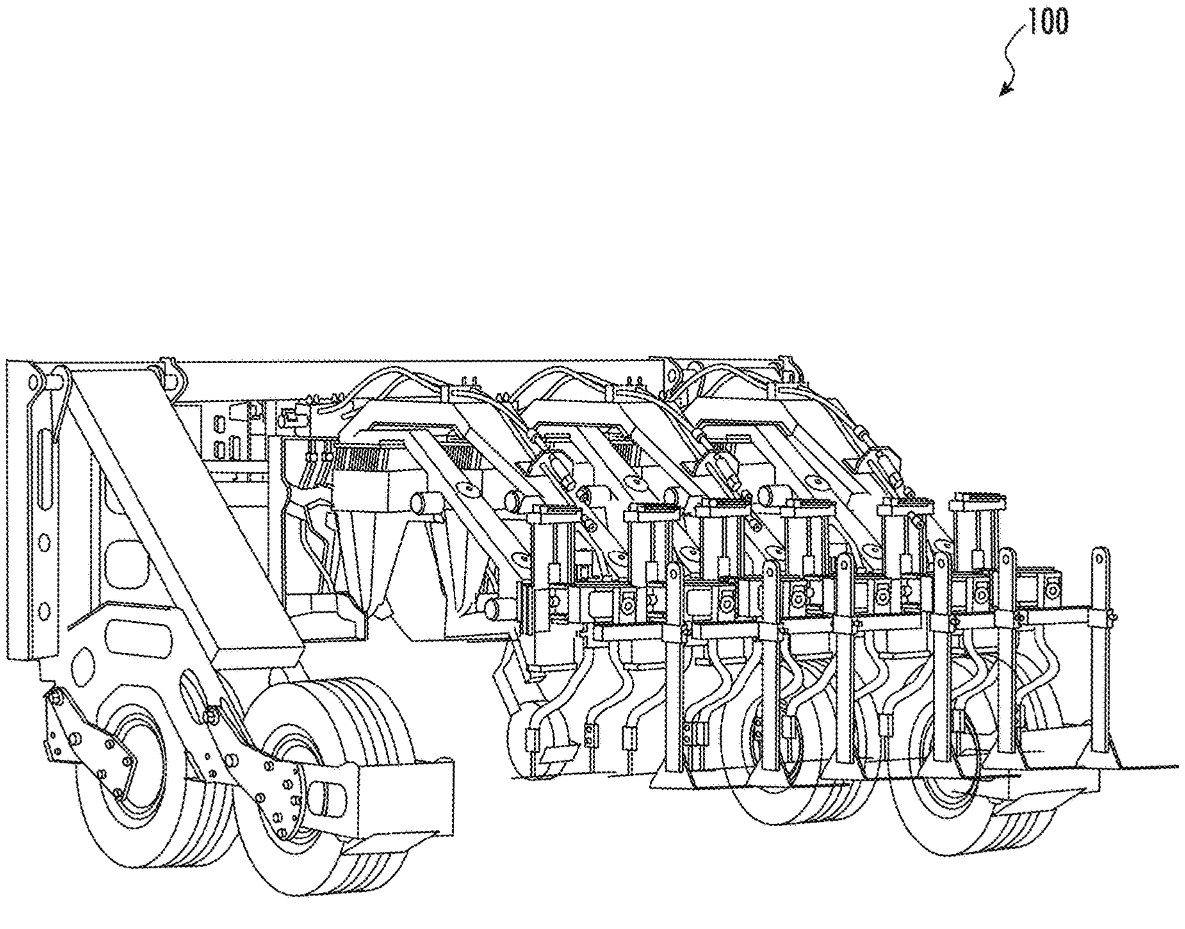
FIGS. 15A-15C are example views of the system in a first, second, and third configuration, respectively.
Figure 15B:
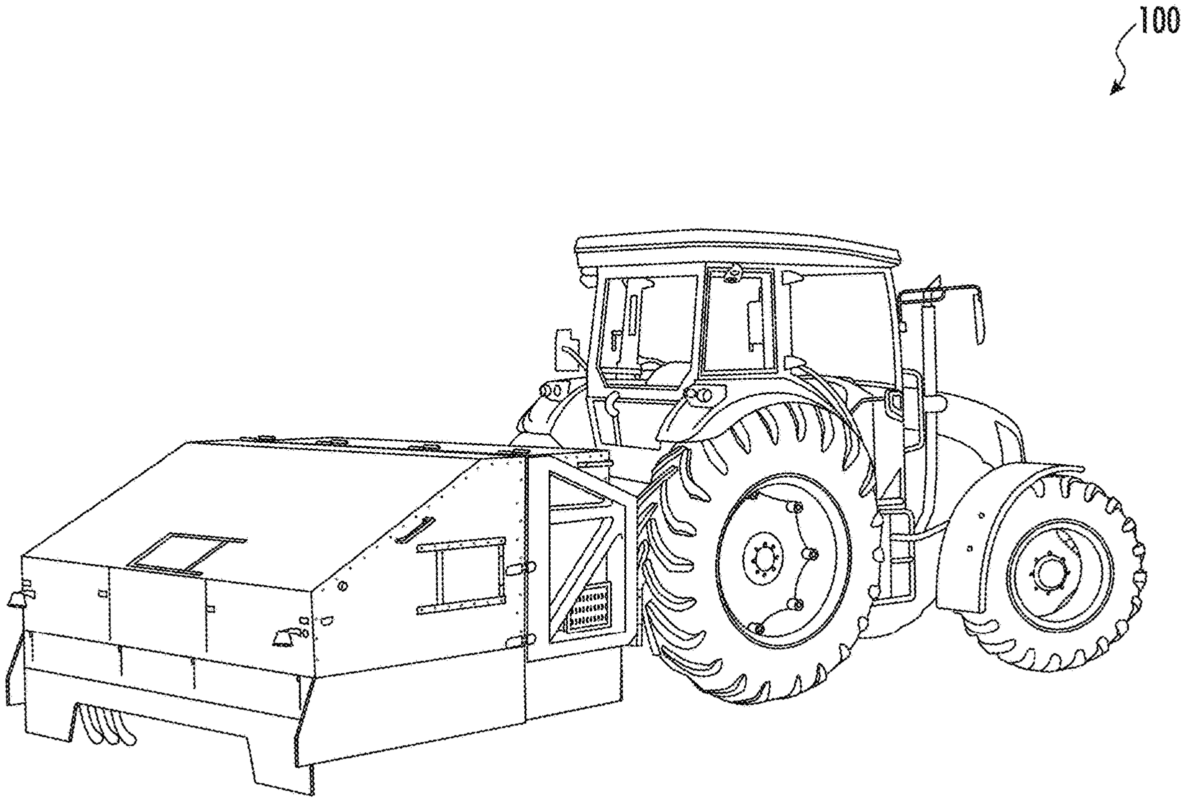
Figure 15C:
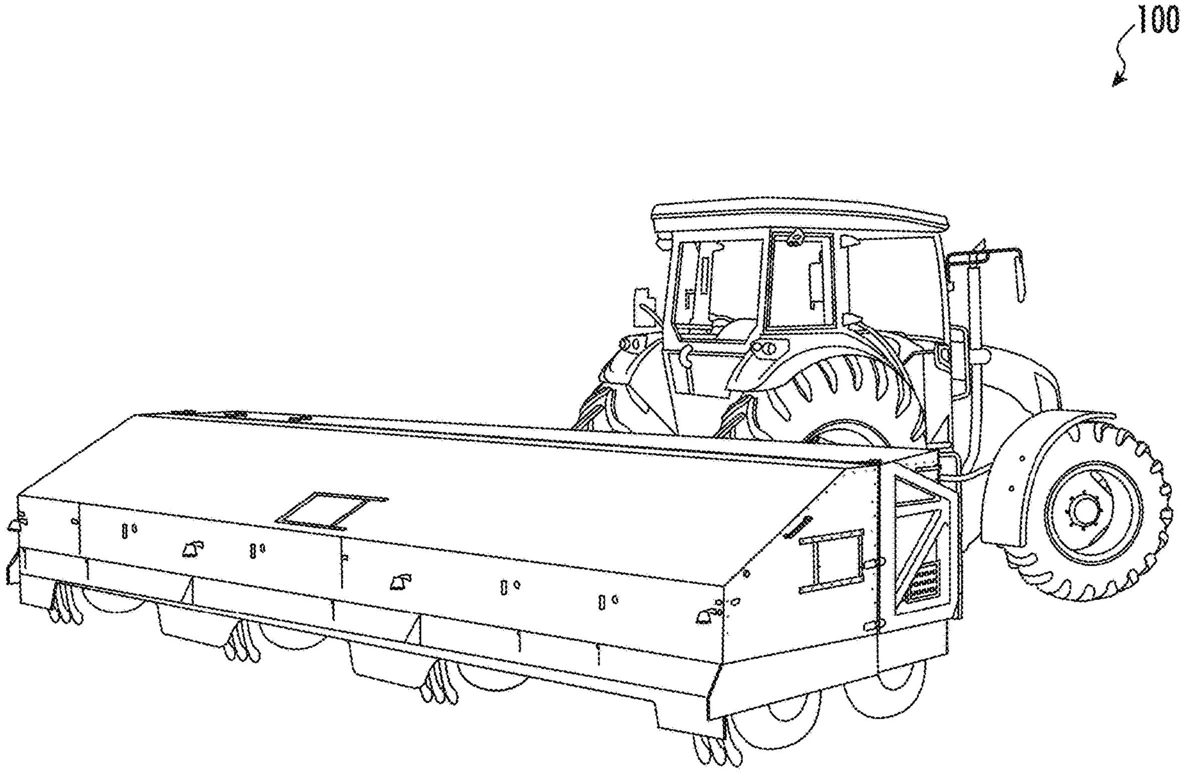
Figure 16A:
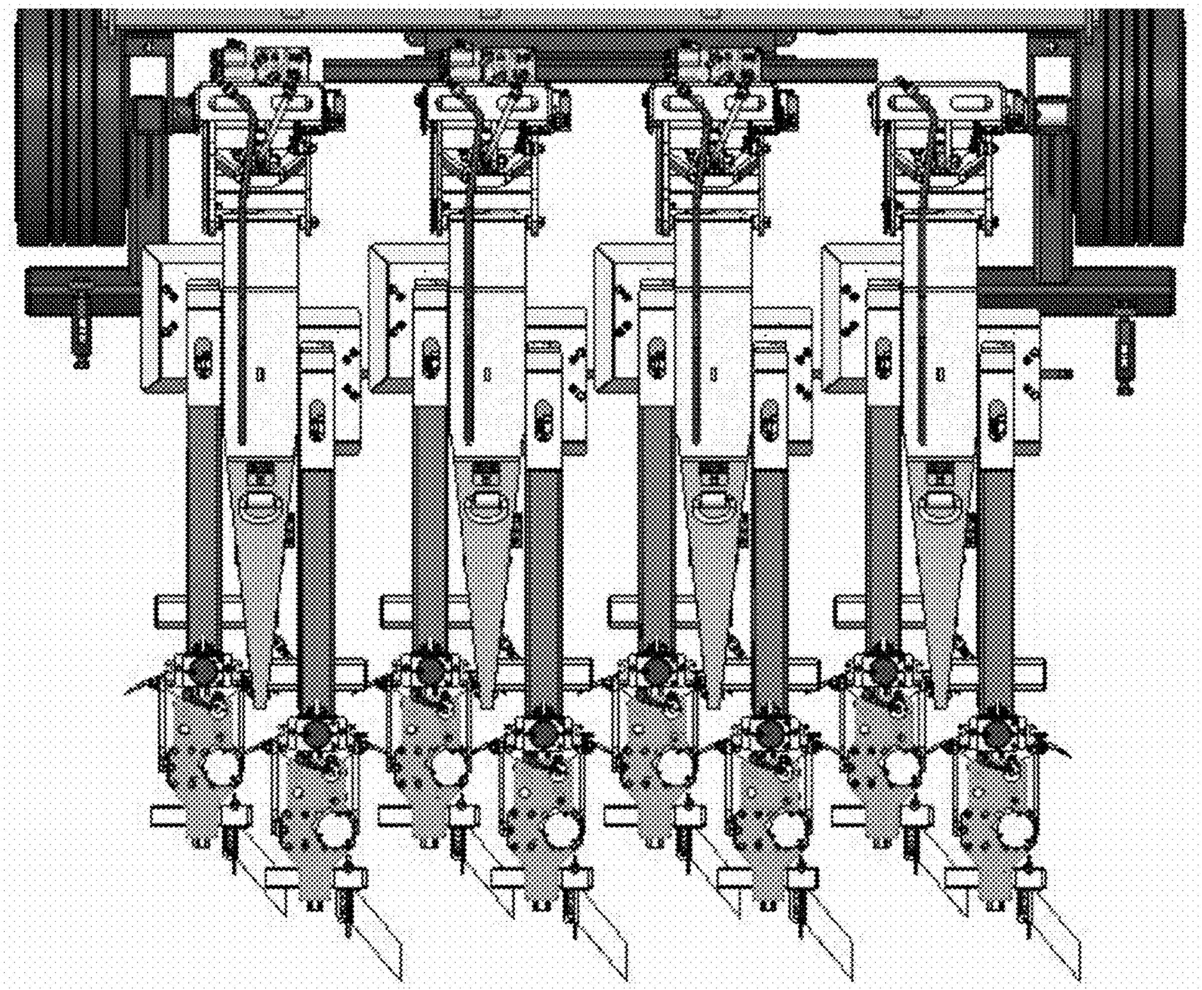
FIGS. 16A-16K are examples of an implement configured for various crop bed spacings.
Figure 16B:
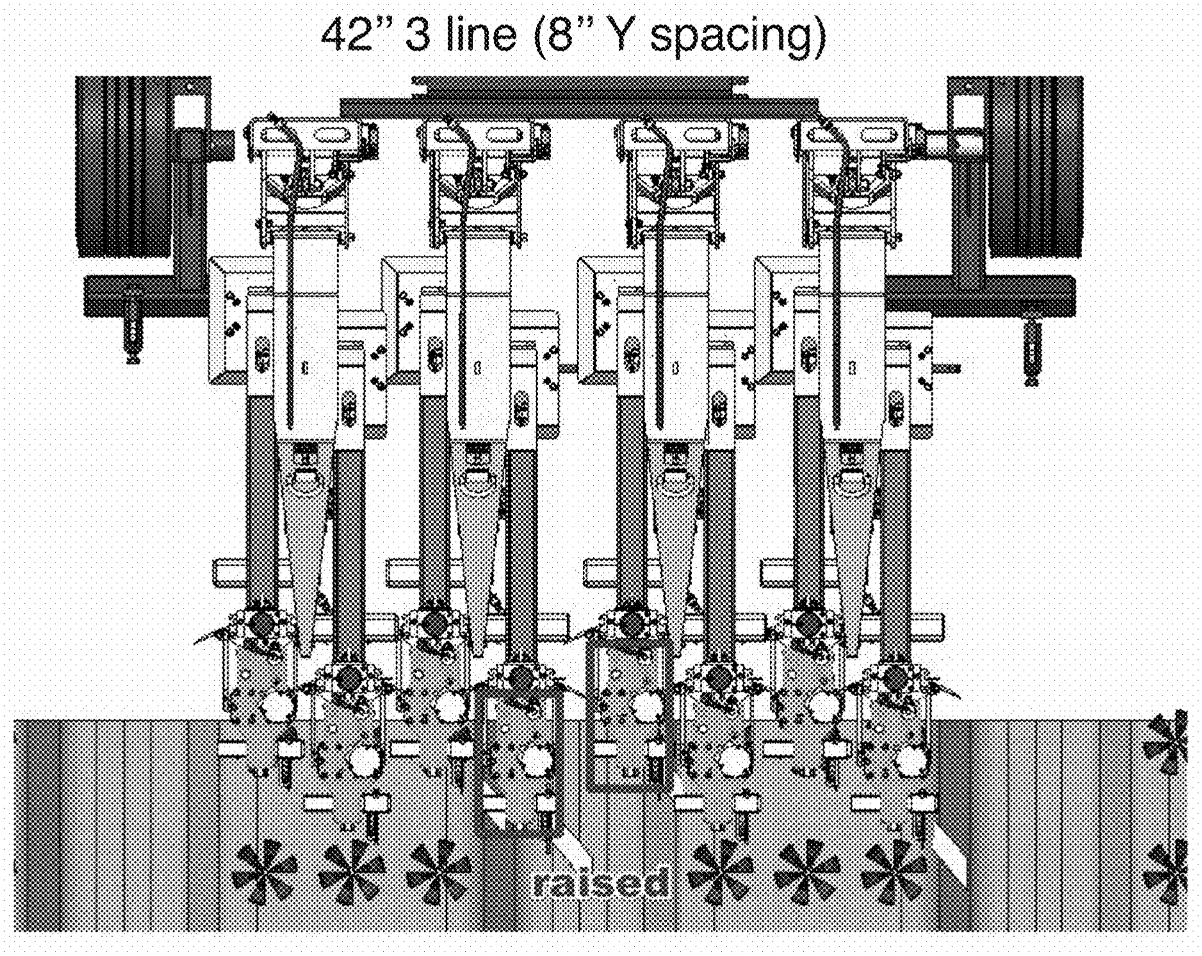
Figure 16C:
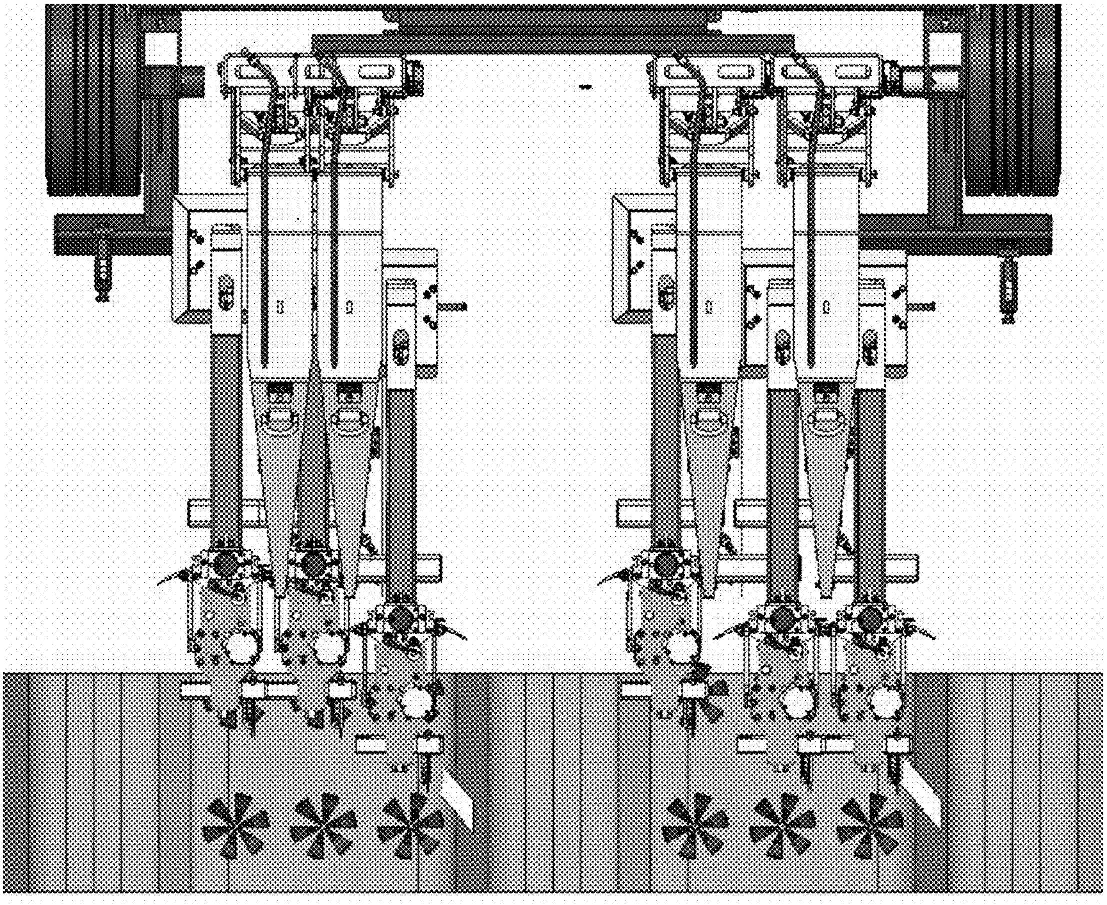
Figure 16D:
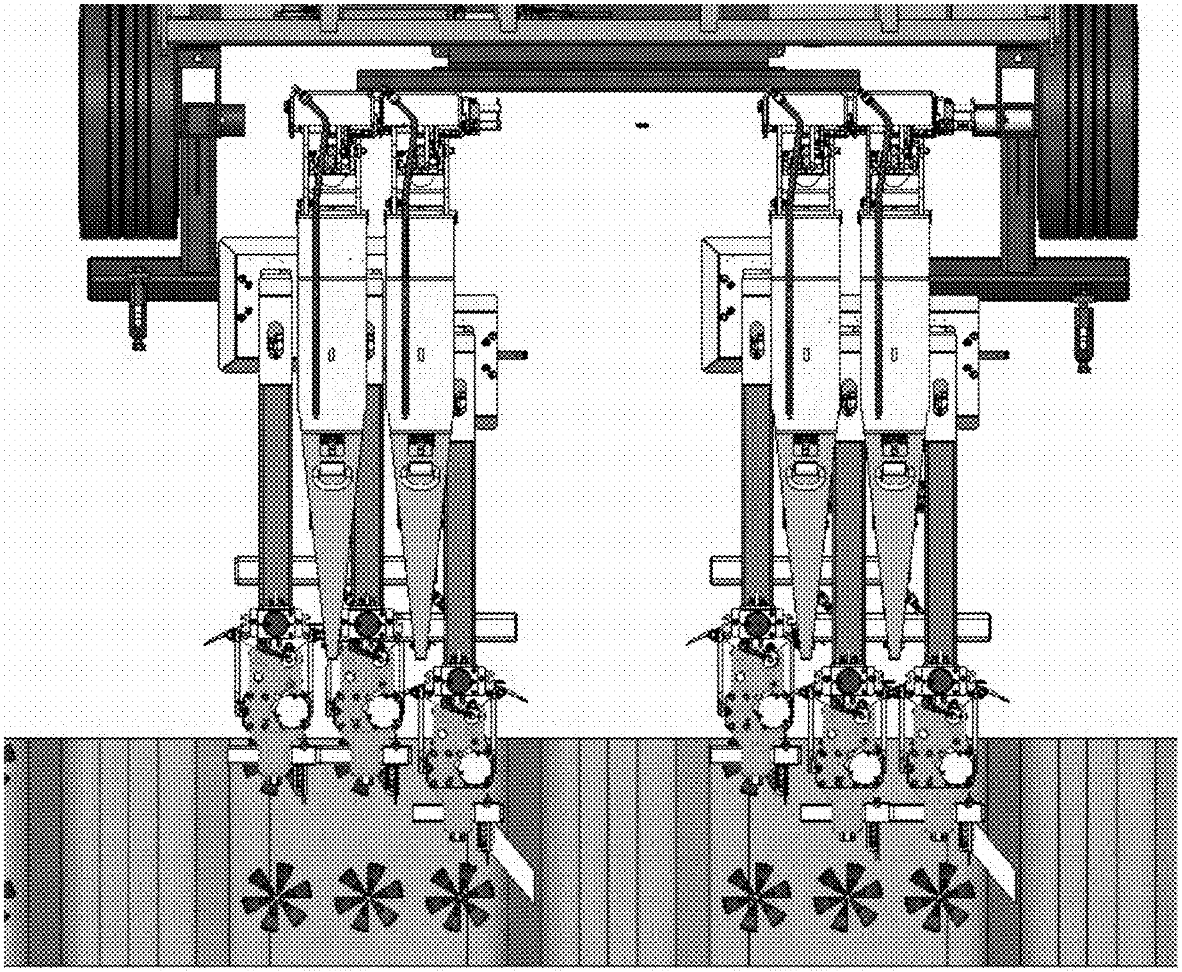
Figure 16E:
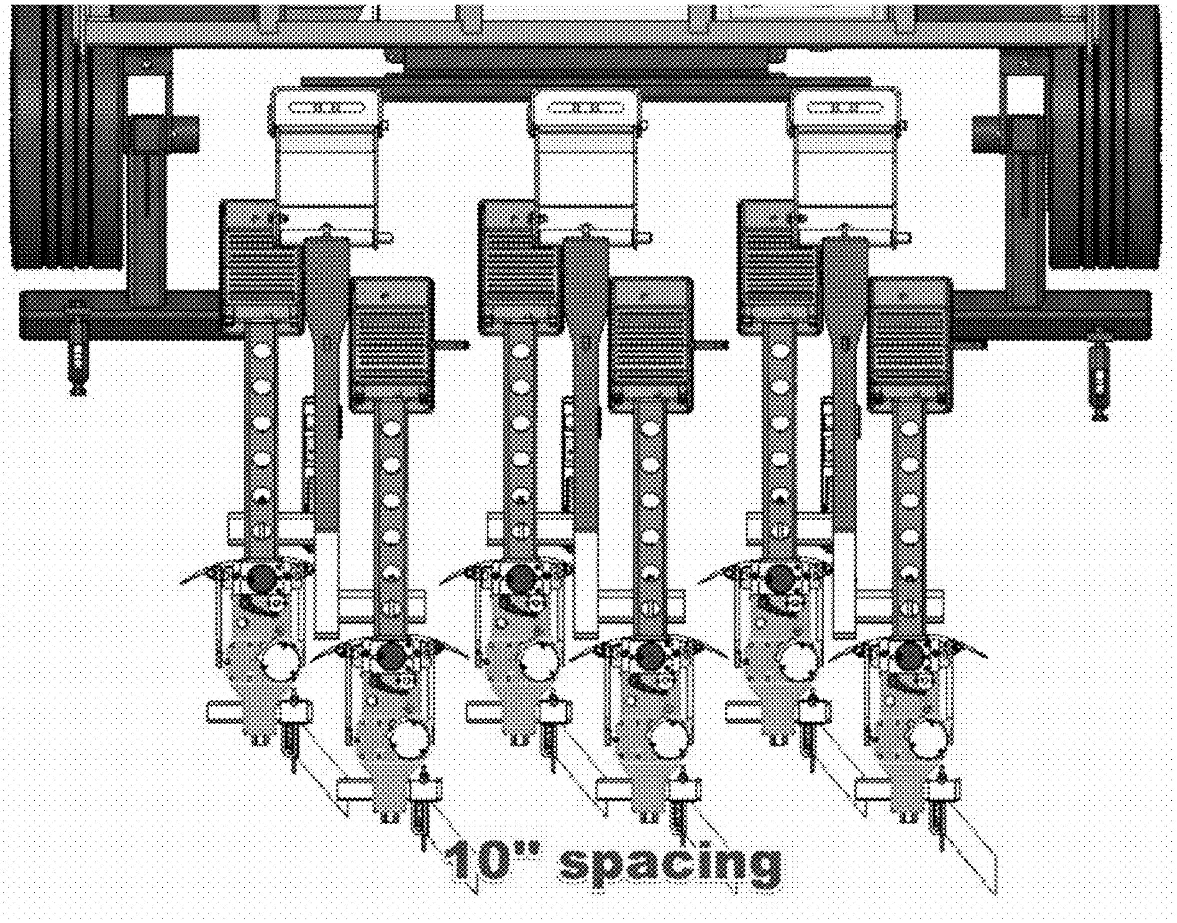
Figure 16F:
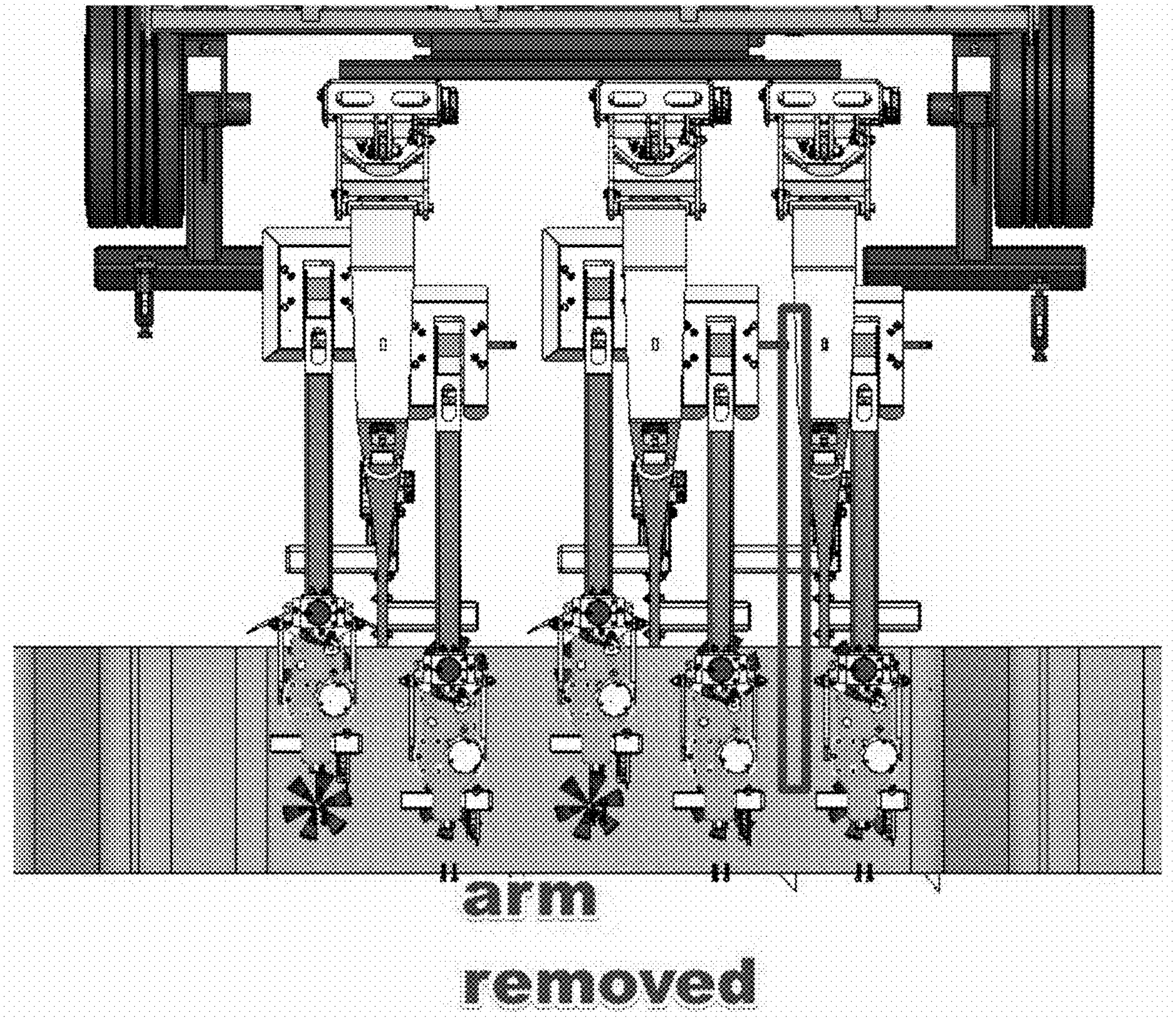
Figure 16G:
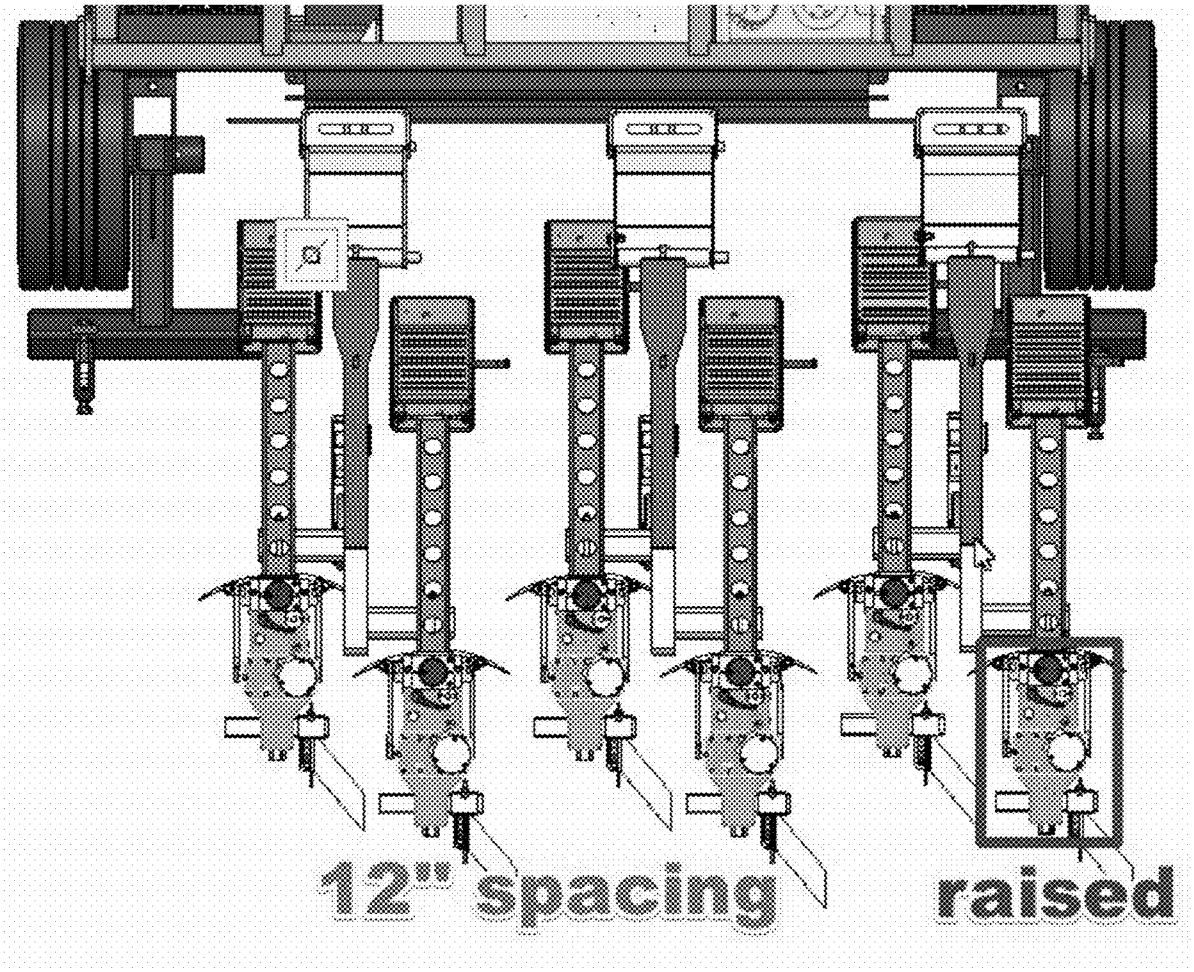
Figure 16H:
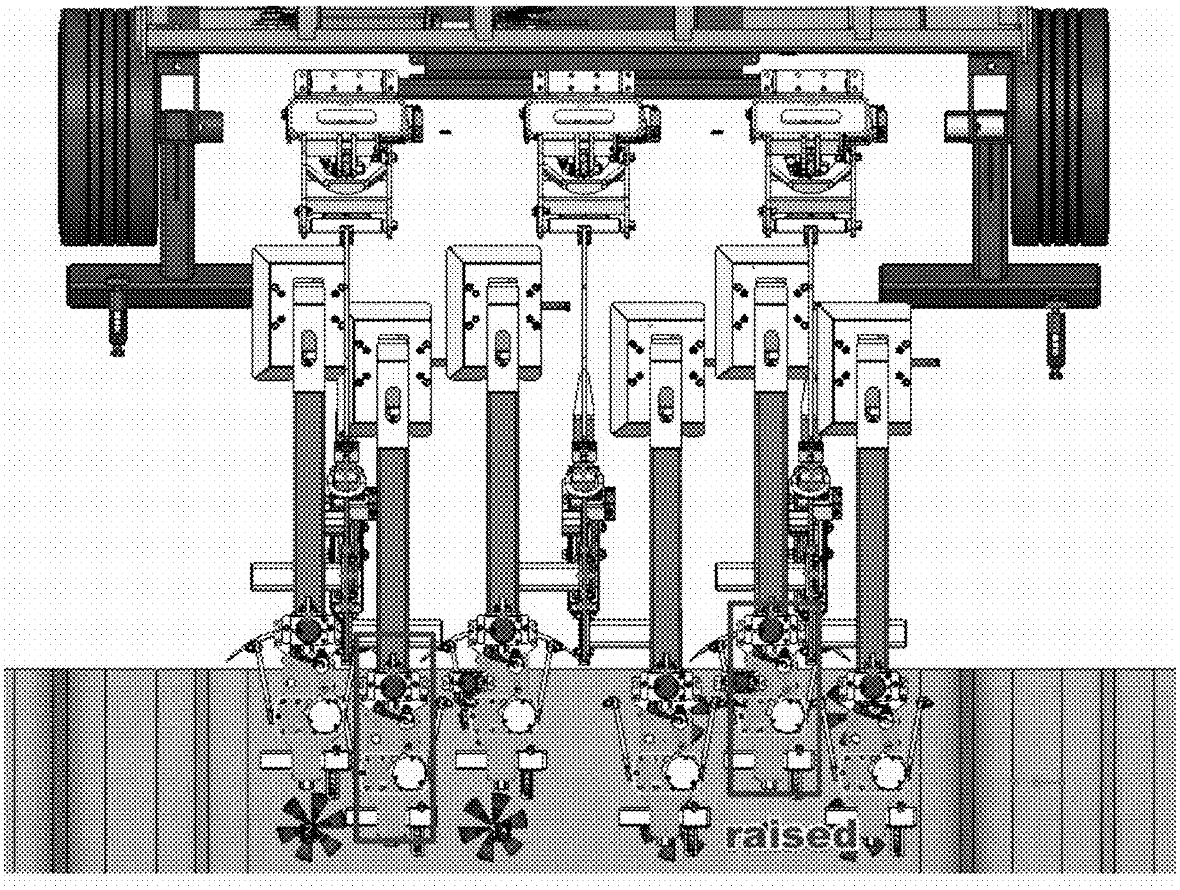
Figure 16I:
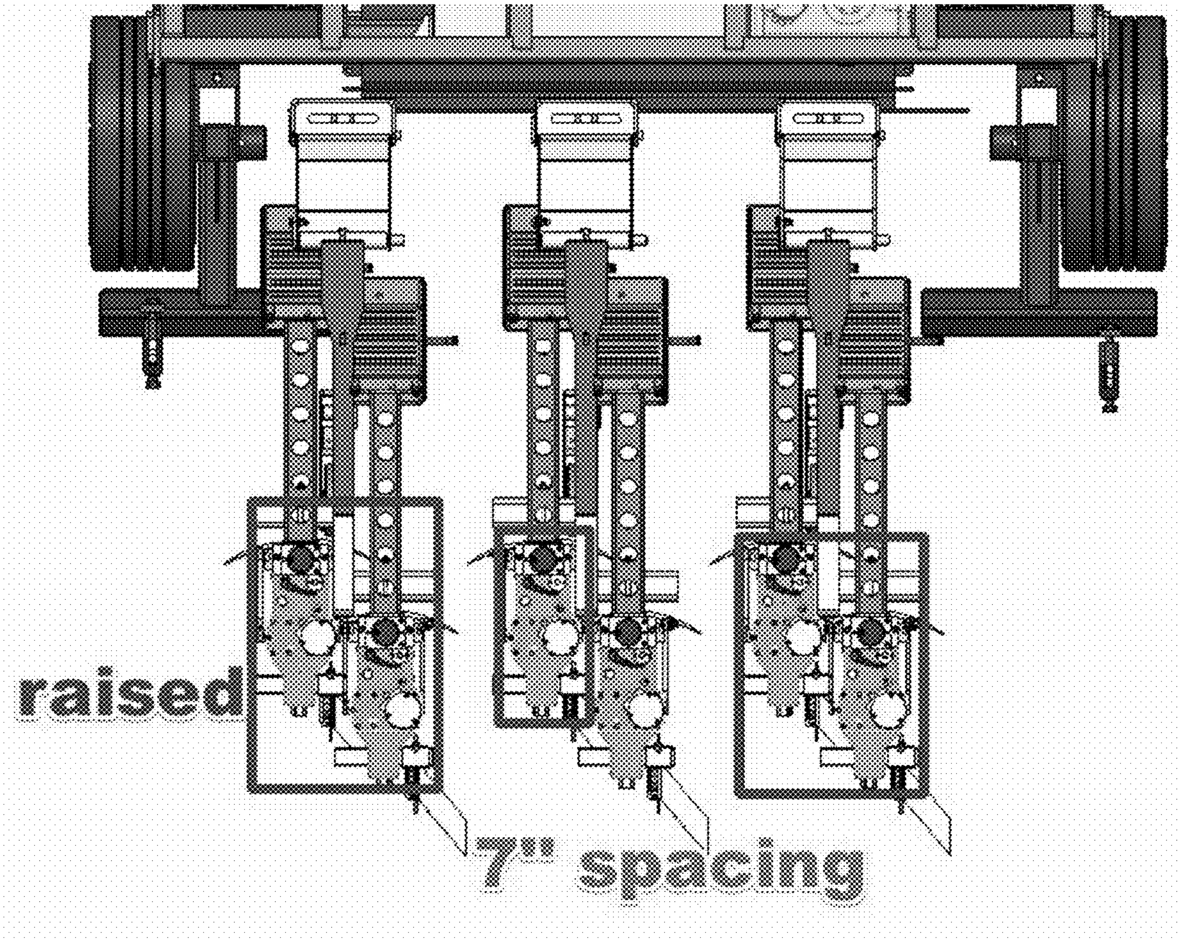
Figure 16J:
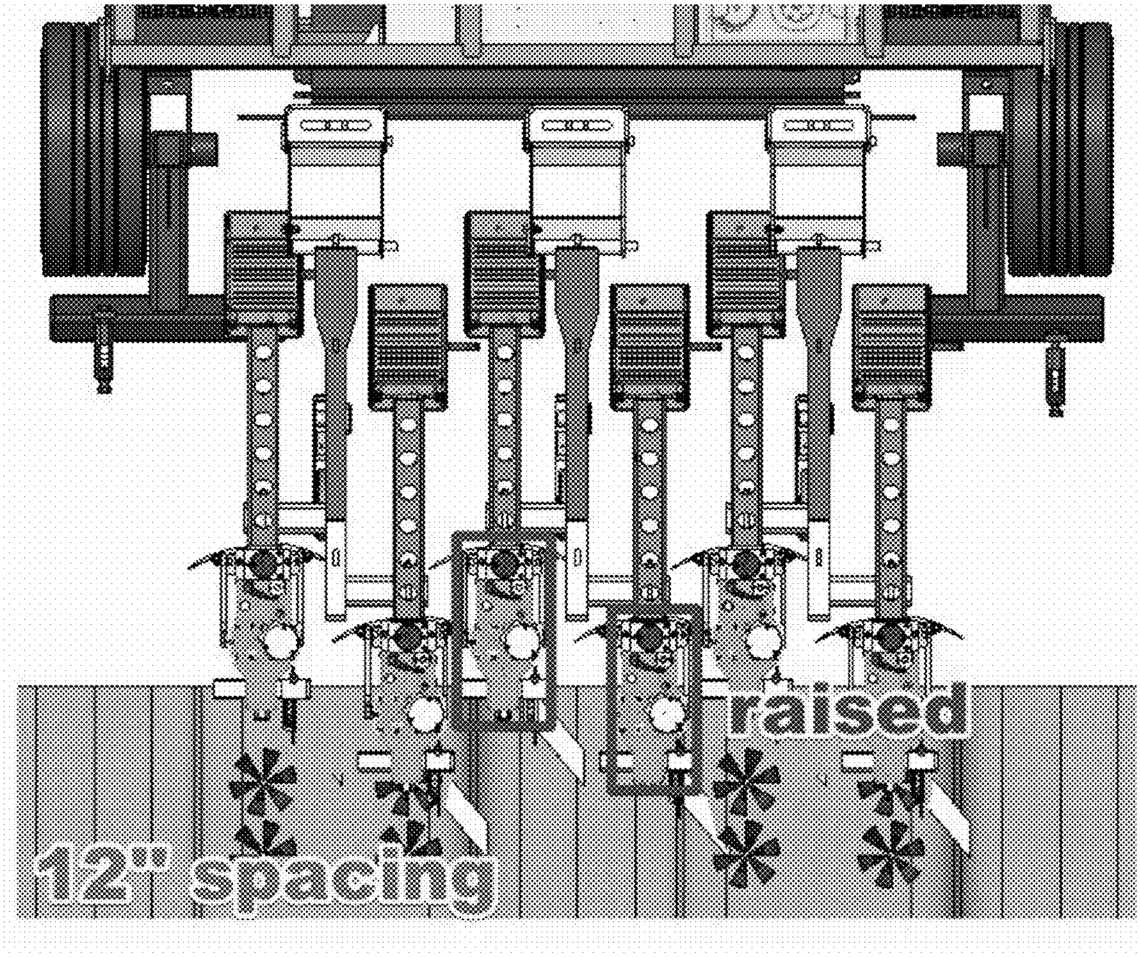
Figure 16K:
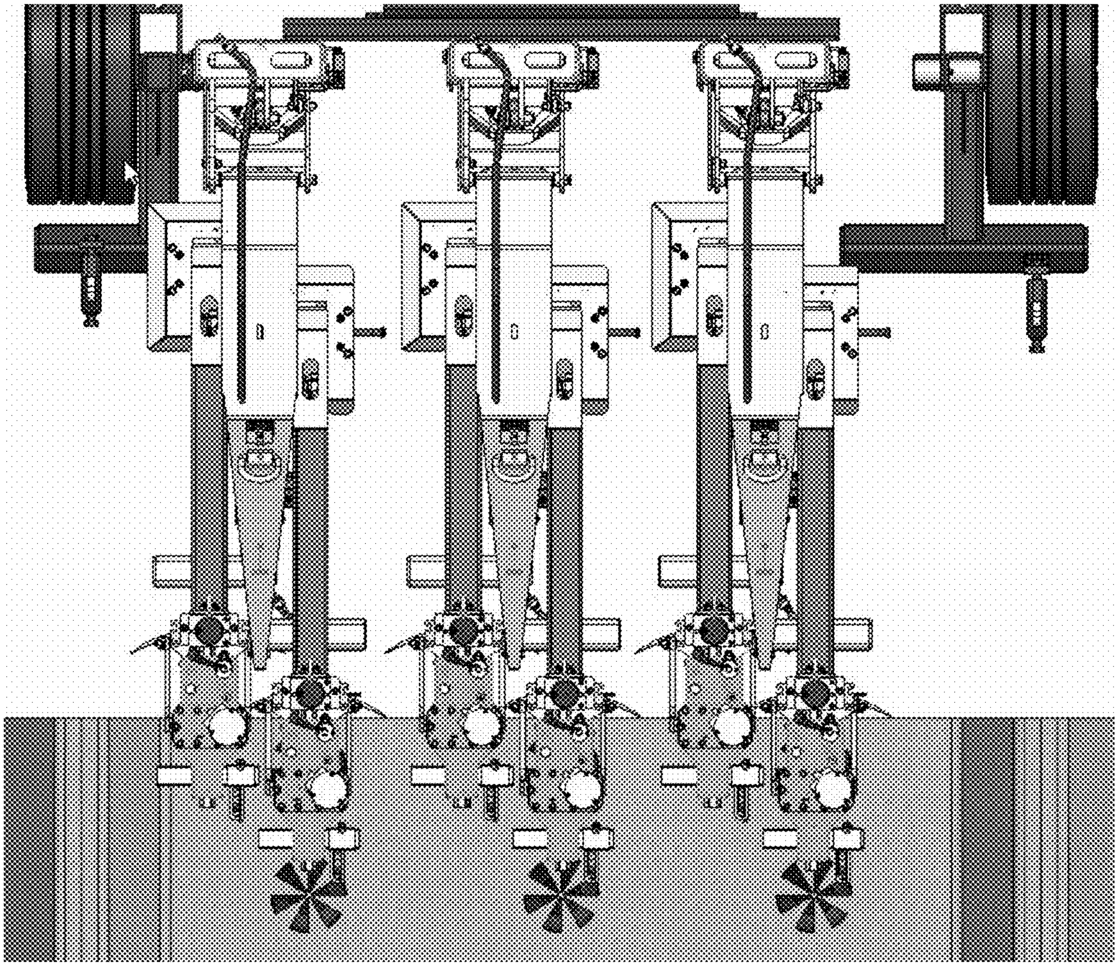
Figure 17A:
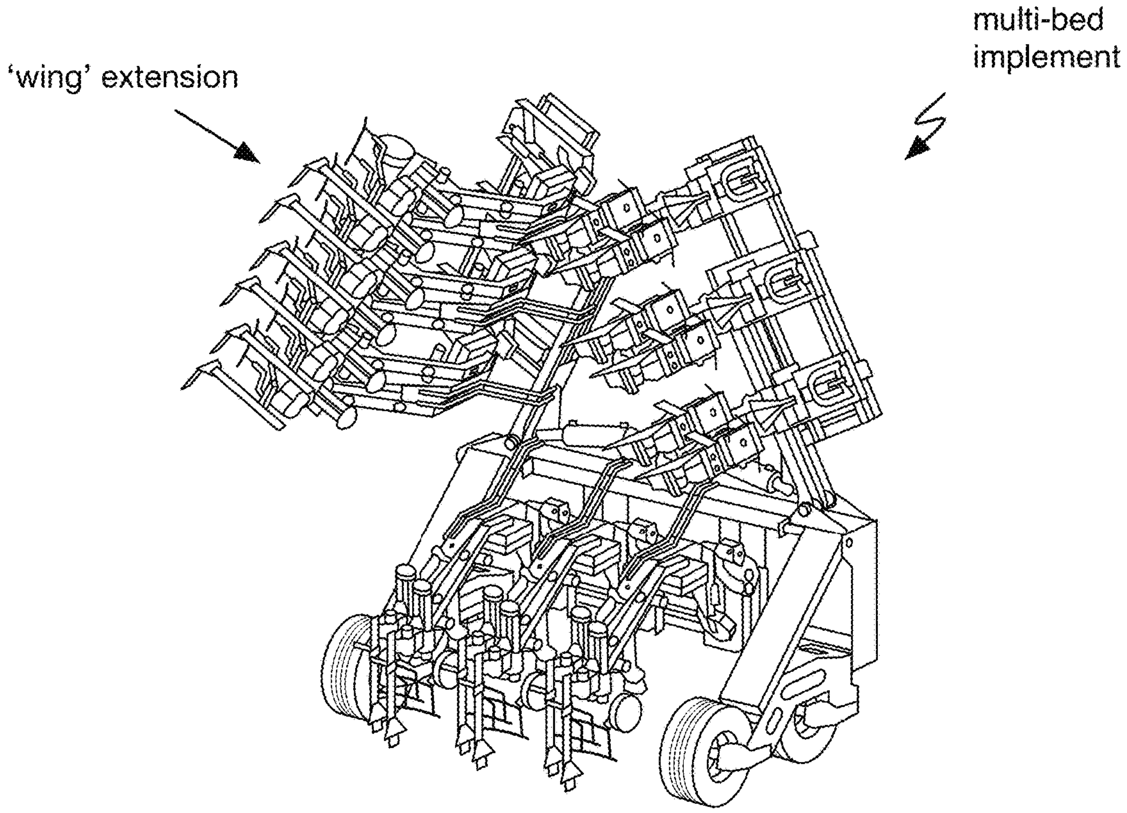
FIGS. 17A-B are trimetric views of an example of a triple bed implement in a first and second configuration, respectively.
Figure 17B:
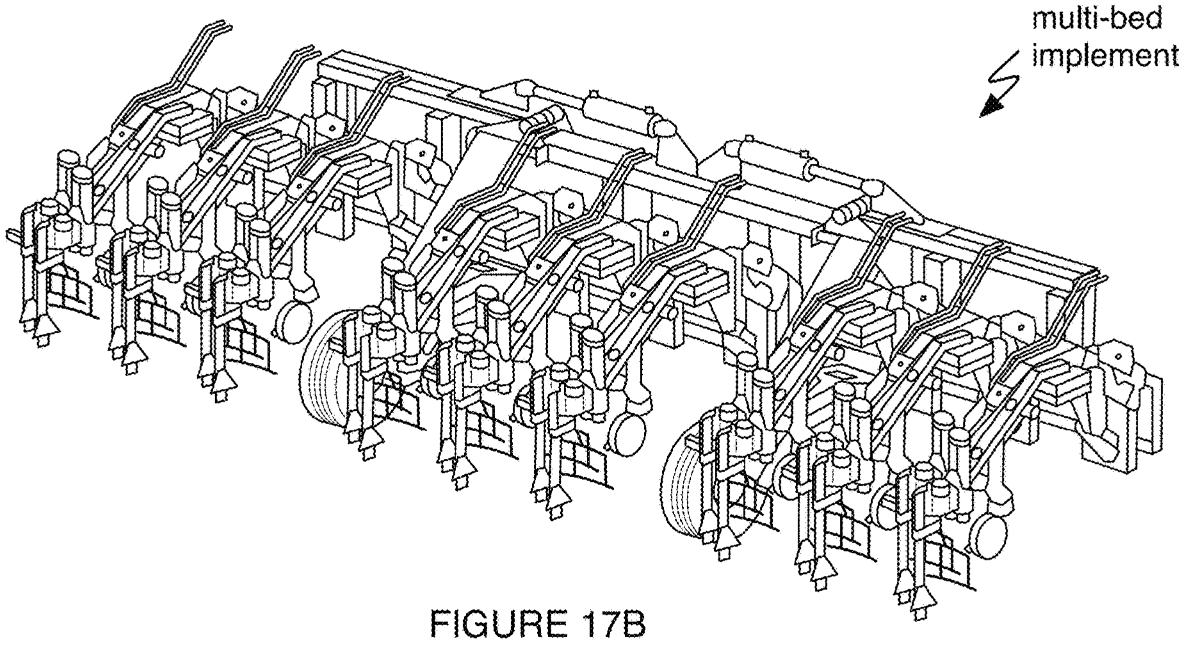
Figure 20:
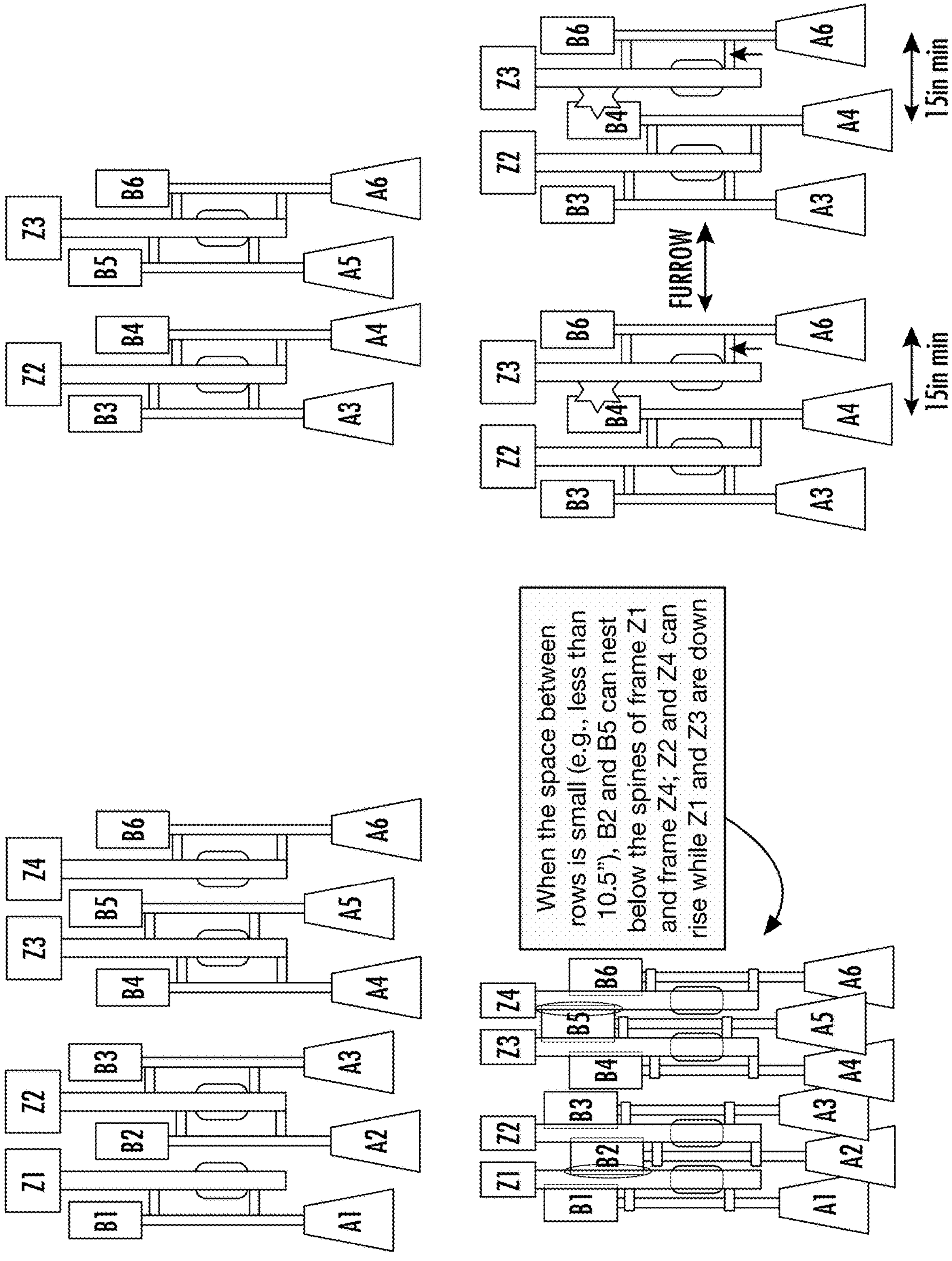
FIG. 20 are example configurations of a variant of the system.

In one set of variants, the system can include an implement frame which mounts a plurality of (modular) weeders. The weeders can include a feeler wheel and supporting frame structure (e.g., an example is shown in FIG. 9), which support the weeder relative to the ground and implement frame, respectively. The weeders can be individual modules (e.g., with a single weeder mounted to the frame) or multi-weeder modules (e.g., dual weeder modules; with a pair of weeders mounted to the frame, on either side of the frame). Each modular weeder can include one or more (e.g., two) effectors, which can perform automated, perception-based weeding by controlled articulation of a set of blade actuators (and/or blades mounted thereto). For example, each weeder module can include a set of sensors (e.g., perception sensors, camera, stereo-camera pair, multi-spectral camera, lidar, etc.), a controller, and a lighting system to facilitate automated weeding operation. Additionally, each weeder module can include a set of actuators to adjust the height of the weeder (and/or sensors thereof) relative to the ground and/or implement frame, which may accommodate deviations in the height of the crop bed (e.g., relative to a base of the furrow; relative to a reference plane and/or reference configuration of the implement; deviations may be on the order of several inches across a multi-acre field). For example, the height of the weeder can be adjusted by dynamically/automatically adjusting the height (and/or mounting angle) of a feeler wheel which supports the weeder relative to the ground. Additionally, the configuration of the implement frame and the modular weeders can be adjusted (e.g., manually, hydraulically, automatically, etc.) to accommodate various field environments. For example, the number and spacing of weeder modules can be configured based on the width of crop beds and the number of crop row lines per bed (e.g., examples are shown in FIGS. 16A-16K; a second example is shown in FIG. 20; one weeder can be aligned with a respective line of crops; etc.). The implement frame can be adjusted by shifting the (relative) position of a set of furrow wheels (e.g., an example is shown in FIG. 2), which can slide laterally (e.g., perpendicular to the crop line and a longitudinal axis of the vehicle; orthogonal to a midsagittal plane of the vehicle and/or system) based on the bed width and/or furrow spacing; and can be adjusted vertically to accommodate various bed heights (e.g., and/or furrow depths; an example is shown in FIG. 4; bed heights may vary between 0 inches and 14 inches relative to the furrow in different agricultural contexts). Additionally, the implement frame can include or be used with a set of mounts, which can mount the modular weeders at adjustable lateral position(s) relative to the implement frame (e.g., facilitating adjust to rows and longitudinal axis of the vehicle; orthogonal to a midsagittal plane of the vehicle and/or system; which may allow a variable number of weeders to be mounted), which can facilitate coarse lateral position adjustments of weeder modules (and/or effectors mounted thereto) based on the number and/or spacing of crop rows within a bed. Additionally, the weeder module(s) and/or effectors mounted thereto can additionally be adjusted laterally relative to the feeler wheel and/or weeder frame, which can facilitate additional granular adjustments (e.g., infinitely adjustable via setting a clamp position along a slidable support rail, etc.) to (granularly) align each effector (and/or a corresponding pair of effector 'weeding' blades) with a respective row of crops. The height of each effector (e.g., relative to the feeler wheel) can be adjusted/configured based on the desired application (e.g., setting a blade depth, which may vary based on the type of crops, soil, etc.; remotely controlled/adjusted via an HMI and/or manually). The implement frame structure can be a single-bed structure (e.g., configured to facilitate weeding along a single bed of crops and/or between a pair of furrows; an example is shown in FIG. 15A, a second example is shown in FIG. 15B) and/or a multi-bed structure (e.g., configured to facilitate simultaneous weeding along multiple beds of crops; fixed or hinged, such as a bi-fold, tri-fold, or other linkage structure; a first example is shown in FIG. 4; a second example is shown in FIG. 15C; a third example is shown in FIGS. 17A-17B).

In a second set of variants, nonexclusive with the first, an agriculture implement includes: an implement frame with a set of furrow wheels; and a plurality of weeder assemblies adjustably mounted to the frame, each weeder assembly including: a modular frame; a first actuator mechanically coupled to the modular frame and the implement frame, the first actuator configured to adjust a height of the modular frame relative to the implement frame; a set of sensors supported by the modular frame, the set of sensors comprising a camera, a position of the camera defining a sagittal plane; a lighting system proximal to the camera, wherein the sagittal plane intersects the lighting system; an effector mount mechanically coupled to the modular frame; an effector attached to the effector mount, including: a second actuator, wherein the sagittal plane intersects the second actuator; and a blade mounted to the second actuator; and a controller communicatively coupled to the second actuator and each sensor of the set of sensors, the controller configured to autonomously control the second actuator based on sensor data collected by the set of sensors.

In a third set of variants, nonexclusive with the first and second, a modular assembly for an agriculture implement, includes: a frame; a first actuator mechanically coupled to the frame and configured to adjust a height of the modular frame relative to the agriculture implement; a set of sensors supported by the modular frame, the set of sensors comprising a camera; a lighting system proximal to the camera; an effector mount mechanically coupled to the modular frame; and a controller communicatively coupled to each sensor of the set of sensors, the controller configured to autonomously control an effector based on sensor data collected by the set of sensors.

2. Benefits

Variations of the technology can afford several benefits and/or advantages.

First, variations of the technology can provide reliable weeding precision under a variety of field and lighting conditions. Variants can allow the implement and/or 'weeder' modules to be flexibly configured (and reconfigured) to accommodate a range of crop bed spacings (e.g., examples are shown in FIGS. 16A-16K) to enable weeding operation in a variety of field settings. Variants can facilitate inter-row and/or intra-row (mechanical) weed removal with sub-inch precision, reducing or eliminating the need for hand weeding crews (e.g., which may conventionally be employed for a variety of vegetable crops, such as lettuce and broccoli). Variants can additionally integrate modular connections for power, data, actuation, and/or any other suitable connection(s). Second, variations of the technology can be integrated with a 3-point equipment frame, which may allow conventional agriculture equipment (e.g., a tractor) to be supplemented with advanced, vision-based operation of an implement. Third, variations of the technology can reduce the dimensional footprint and mass of the implement and/or modular assemblies thereof, which can provide a large range of flexibility in entering fields. Additionally, reducing the mass of the system and/or modules thereof mass can enable greater operational speeds and efficiency for a given vehicle/tractor. Fourth, variations of the technology can provide embedded intelligence and accurate implement operation action to achieve consistent quality and performance (e.g., under a variety of lighting conditions). Additionally, variants can provide direct (supplemental) lighting which may reduce or eliminate the influence of varying ambient lighting conditions (e.g., daytime lighting, overcast lighting, shade/shadows, nighttime lighting, etc.) on system operation and/or plant detection. Fifth, variations of the technology can facilitate operator visibility and ease-of-use of system operation, adjustment, and control action, which may improve auditability and maintenance (e.g., via an HMI). Sixth, variations of the technology can facilitate 'per-row' (and/or plant-level) perception, lighting, and compute. For instance, the modular architecture can be configured to arrange a camera(s), lighting system, controller, and effector in alignment with each individual row of plants (e.g., along a sagittal plane of the system, which intersects each component and is substantially aligned with the crops in the row). Such variants may improve the flexibility/reconfigurability to accommodate various bed arrangements. Additionally, such variants may improve operational precision (i.e., with greater imaging resolution) and/or accuracy by minimizing image and/or lighting distortion (i.e., when compared to multi-row sensing). Additionally, such variants may improve detection accuracy by leveraging assumptions regarding crop arrangement relative to the camera (e.g., without calibration/re-calibration of such assumptions). For example, under any arbitrary bed configuration, it may be assumed that a crop row (targeted for intra-row weeding) and each individual crop therein lies in a midsagittal plane of the camera (e.g., when the module and camera thereof are aligned with the crop row line) and/or camera field of view (FOV).

Additionally, variations of this technology can include an approach necessarily rooted in computer technology for overcoming a problem(s) specifically arising in the realm of autonomous systems. In a first example, the technology can automatically detect crops (e.g., on a per-row basis) and autonomously control implement effectors to perform an agriculture operation (e.g., weeding) based on the crop detections. In a second example, the technology can enable control of a partially and/or fully autonomous system via edge sensing, compute, and actuation/control. In a third example, the technology can facilitate agriculture operations via remote (tele-) operation of the system and/or elements thereof. In a fourth example, variants can facilitate autonomous field data generation during an agriculture operation, with plant-level localization, which may facilitate plant-level analysis (e.g., individual plants and/or field aggregates; yield estimation based image analysis of individual plant detections, etc.). In a fifth example, the system can facilitate operation in conjunction with a manned or unmanned vehicle (e.g., tractor), with remote operation (i.e., tele-operation) of system parameters via an HMI.

However, variations of the technology can additionally or alternately provide any other suitable benefits and/or advantages.

3. System

The system 100, an example of which is shown in FIG. 1, can include: an implement frame 110 and a set of modular assemblies 120. The system can optionally include a vehicle 102 and a set of effectors 130. However, the system 100 can additionally or alternatively include any other suitable set of components. The system can function to facilitate automated and/or perception-based weeding and/or other automated agricultural operations. Additionally, the system can function to collect plant-level data on crops during implement operation. However, the system can additionally or alternatively be configured to provide any other suitable functionality.

Figure 14:
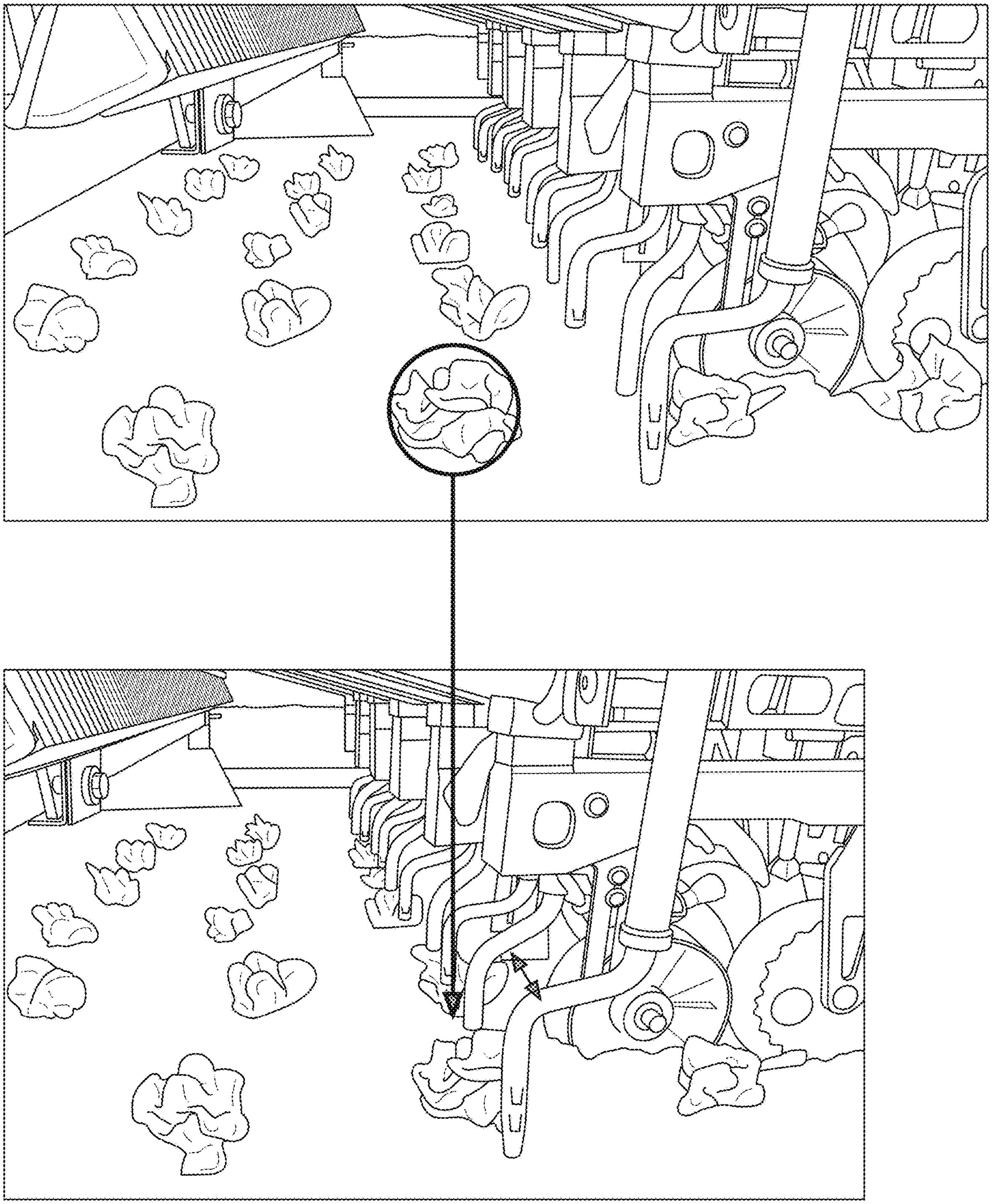
FIG. 14 is a diagrammatic example of effector actuation with a variant of the system.

In one set of variants, the system 100 can be a modular and/or reconfigurable farming implement, such as a drag implement, which can be towed behind the vehicle (e.g., a tractor) to facilitate perception-based agricultural operations. As an example, the implement can be a weeding implement, wherein each modular assembly actuates a set of blades (e.g., opening and closing them around each plant; an example is shown in FIG. 14) to mechanically remove weeds within a crop bed (e.g., intra-row and inter-row). However, the implement can be configured to perform any other suitable agricultural operations.

3.1 Implement

The implement frame functions to structurally support the modular assemblies and/or facilitate adjustment of a relative mounting arrangement (spacing) of the modular assemblies. Additionally, the implement frame can facilitate attachment to and/or integration with a vehicle, such as a tractor.

The implement frame can include a central body which is substantially rigid and functions to connect the implement to a vehicle (e.g., tractor). For example, the central body can include or be integrated with a hitch (e.g., three-point hitch, universal hitch, Category II three-point hitch attachment, tow hitch, etc.) or other coupling mechanism (e.g., drawbar, linkage, etc.).

The implement frame can include a plurality of furrow wheels 112 (e.g., an example is shown in FIG. 2) which functions to traverse within the furrow(s) and at least partially support the mass of the implement. The arrangement of furrow wheels is preferably symmetric about a midsagittal plane of the implement (e.g., with at least one furrow wheel on each side of a midsagittal plane), with at least one furrow configured to roll within each furrow adjacent to a bed (e.g., on a left and right side of the bed). For example, there can be a single (symmetric) pair of furrow wheels (e.g., which support the implement against a left and right furrow on either side of a bed), two pairs of furrow wheels, and/or any other suitable number of furrow wheels. Alternatively, furrow wheels can support the implement against more than two furrows, and/or can be otherwise suitably arranged. The implement frame can include: at least one furrow wheel, 2 furrow wheels, 3 furrow wheels, 4 furrow wheels, 6 furrow wheels, 8 furrow wheels, more than 8 furrow wheels, any open or closed range bounded by the aforementioned values, and/or any other suitable number of furrow wheels.

The furrow wheels are preferably mounted to the central body by a set of translatable (slidable) mounts, which functions to adjust and/or customize the spacing between pairs of furrow wheels (e.g., to match the bed width and/or a furrow spacing for a particular field; examples are shown in FIG. 16A-16K). For example, the furrow wheels can be mounted along a lateral rail (e.g., with a central axis orthogonal to a midsagittal plane) and configured to linearly transform along the lateral rail. For example, the mounts can be manually adjustable (e.g., selectively mounted at one of a plurality of mounting positions, such as along an array of mounting holes; slidable with a set of rail trucks or roller bearings running in a set of lateral channels; etc.), linearly actuatable (e.g., rack and pinion actuation, linear actuation along a set of lateral rails, etc.), electrically actuatable, hydraulically actuatable, and/or otherwise suitably adjustable. However, the implement frame and/or the arrangement of the furrow wheels can be otherwise suitably configured.

Additionally, the vertical mounting position (i.e., height) of the furrow wheels can optionally be adjustable, which may facilitate greater flexibility to differences in bed height (e.g., or furrow depth relative to the bed).

The central body of the implement frame preferably extends between the furrow wheels (and/or furrow wheel mounts) and is supported above the crop bed. The central body can span one or more crop beds (e.g., depending on the width of each bed). For example, the central body can span: exactly one bed, two beds, three beds, more than three beds, and/or any other suitable number of beds. In some variants, the implement frame can optionally include a set of extensions (and/or 'wing' extensions), which extend beyond the furrow wheels (and/or furrow wheel mounts) in a lateral direction. For example, a pair of wing extensions (e.g., a left and a right wing extension) can extend beyond the furrow wheels on either end of the central body, which may facilitate agriculture operations on beds adjacent to the central body (e.g., and/or which are not spanned by the central body). For example, these extensions can be pivotably mounted and/or hinged (e.g., 2 bar 'lever' linkage hinged about a joint, which may allow the extensions to be selectively deployed alongside the central body in a first configuration (e.g., during operation; an example is shown in FIG. 17B) and pivotably raised/stowed in a second configuration (e.g., which may reduce the overall footprint; during storage, when unutilized, etc.; an example is shown in 17A). Extensions can be controllably actuated (e.g., hydraulically, electromechanically, etc.) or fixed (e.g., passively locked in a deployed configuration; unactuated; etc.). However, the implement frame can alternatively exclude such extensions in one or more configurations and/or the implement frame can be otherwise configured.

However, the system can include or be used with any other suitable implement frame(s).

Figure 7:
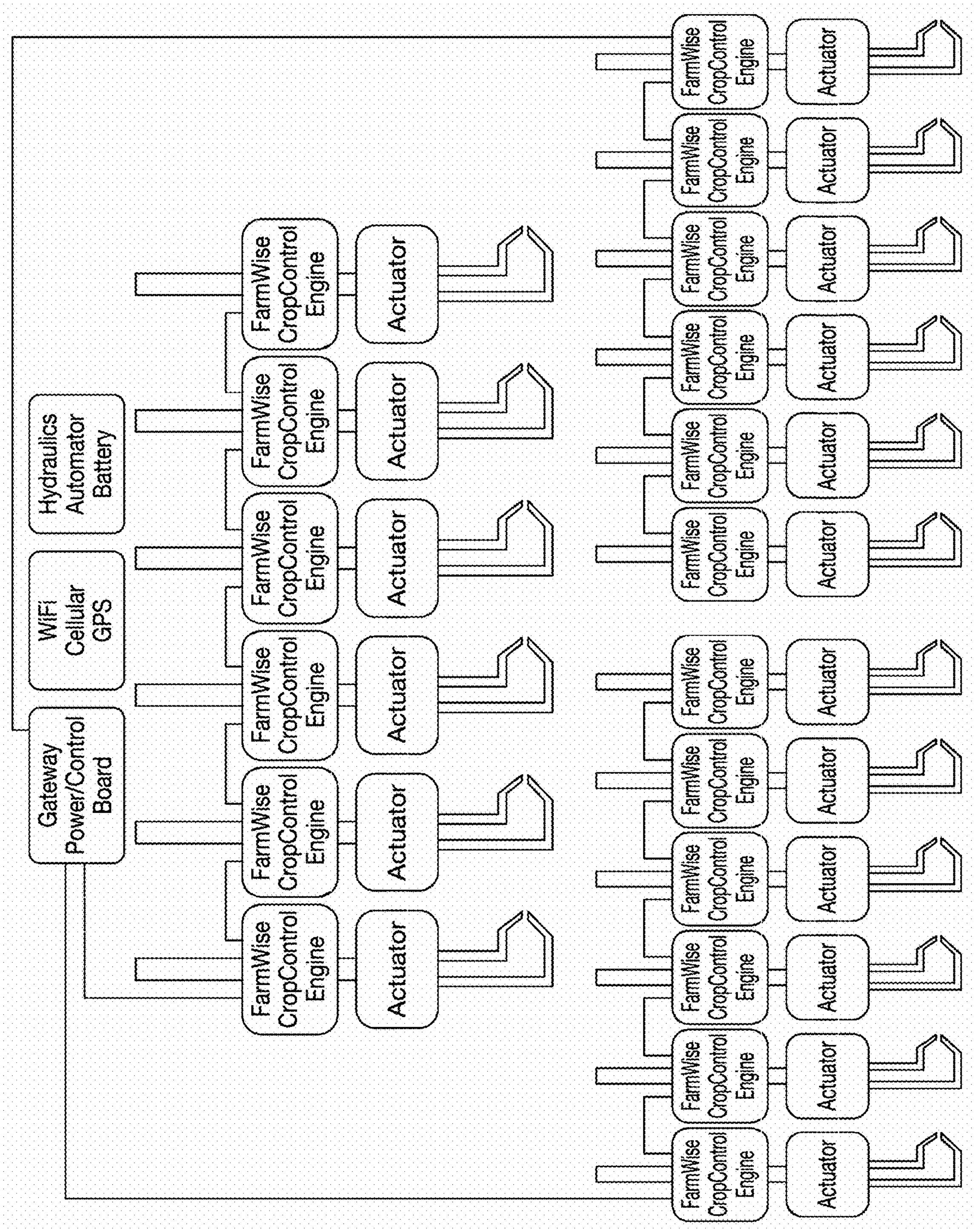
FIG. 7 is a schematic diagram of an example of the system with modular assemblies in one or more variants of the system.

The modular assemblies function to facilitate reconfigurability of the implement (e.g., based on the field bed dimensions and/or arrangement of crop rows) and/or independent adjustment of effector(s) and sensor(s). Additionally, the modular assemblies (e.g., 'weeders') can function to provide all or a subset of sensing, planning, and/or control functionalities to facilitate automated/autonomous (e.g., perception-based) agriculture operation. For example, each modular assembly can be equipped with an assembly package which can facilitate decentralized (i.e., 'edge'): sensing, compute, and/or actuation of a modular plant-level implement (e.g., an example is shown in FIG. 7).

Figure 8:
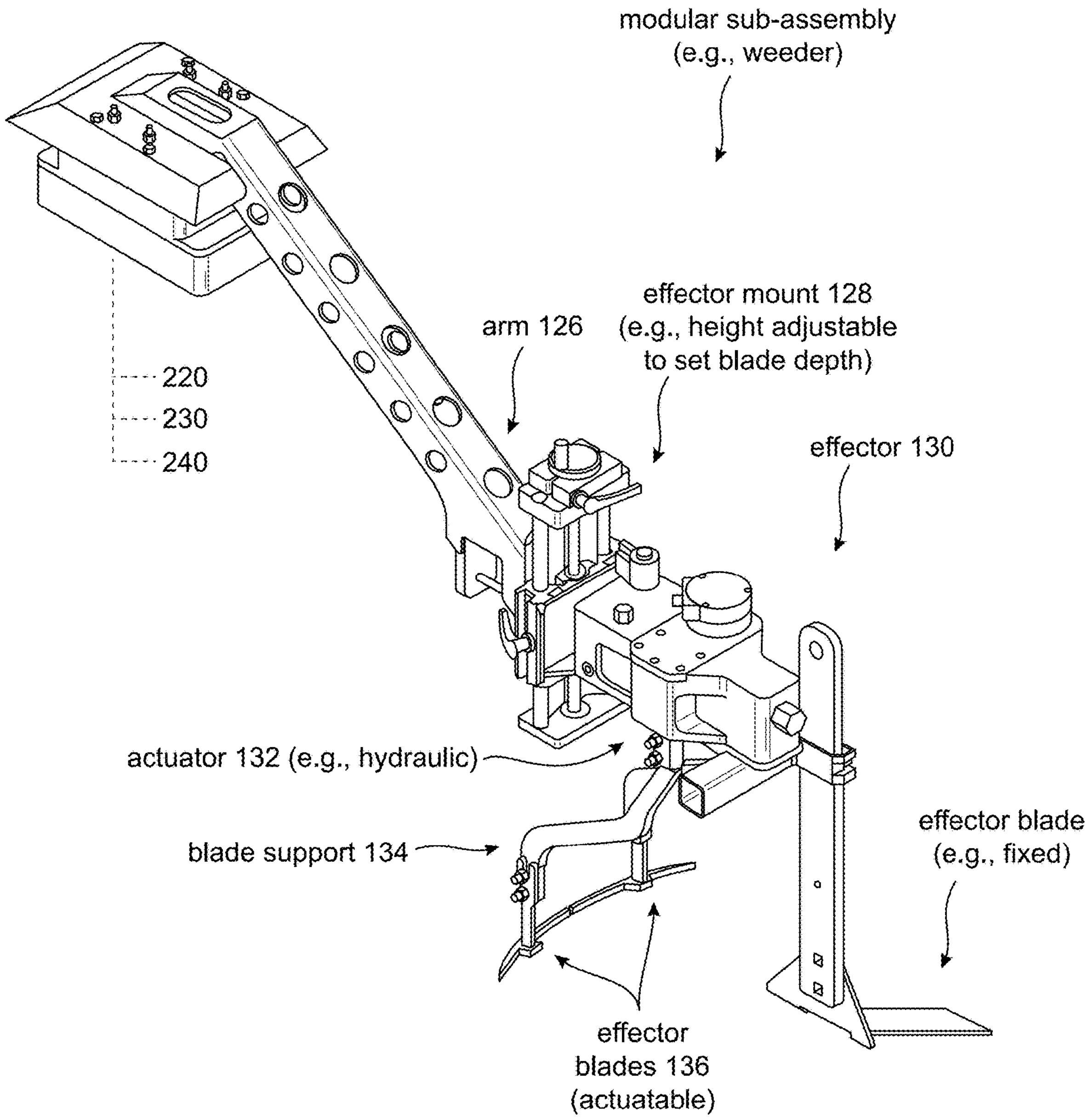
FIG. 8 is a trimetric view of an example of a modular sub-assembly in one or more variants of the system.

The system preferably includes one modular assembly per crop bed spanned by the implement frame. The number of modular assemblies can be: 1, 2, 3, 4, 6, 8, 12, more than 12, any open or closed range bounded by the aforementioned values, and/or any other suitable number of modular assemblies. For example, where the implement frame spans 1 bed with 8 lines of crops (i.e., 8 crop rows per bed), the system can include 4 modular assemblies (e.g., each with a pair of sub-assemblies and effectors, an example of which is shown in FIG. 8; where each assembly is a 'dual' assembly) and/or 8 'plant-level' sub-assemblies (e.g., each servicing a respective line of crops). Alternatively, there can be exactly one modular assembly for a line of crops (e.g., an example is shown in FIG. 16K), and/or any other suitable number of modular assemblies.

Each modular assembly 120 can include: a mount 122, a feeler wheel 124, a set of actuators 210; a set of sensors 220; a lighting system 230; a controller 240; and/or any other suitable set of components.

The mount 122 mechanically connects the modular assembly to the implement frame. The mount can connect at a fixed position (e.g., unitary bolt pattern) or at an adjustable/variable position (e.g., slot mounting, adjustable clamping, hole array, etc.; actuatable mount, such as via a linear actuator, lead screw, ball screw, rack and pinion, rail carriage, etc.). In a first set of variants, each mount can be independently adjustable (e.g., allowing laterally variable mounting) relative to the implement frame. In a second set of variants, nonexclusive with the first, a plurality of mounts (e.g., pairs/groups of mounts, each mount of a bed, etc.) can be connect to an adjustable/actuatable body, allowing the plurality of mounts to be collectively shifted relative to the implement frame. For example, the modular assemblies can be collectively shifted (e.g., laterally; in global Y) along a central channel with a set of incremental notches (e.g., ¼ inch spacing; ½ inch spacing, etc.), wherein a plunger pin can allow the assemblies to be located relative to the central channel (e.g., where they can be fixed in place, such as by a separate set of fasteners, such as a set of bolts, clamps, or other fasteners). However, the mounts can otherwise mechanically connect to the implement frame, and/or can otherwise enable adjustment/reconfiguration of the assembly mounting arrangement relative to the frame. However, the modular assemblies can be otherwise mounted, and/or can be otherwise reconfigurable, adjustable, and/or removable relative to the frame.

The feeler wheel 124 functions to support the modular assembly (and/or a structural frame thereof) against the bed and/or can be configured to roll within the bed (e.g., between lines of crops and/or between a line of crops and a furrow). The feeler wheel can additionally or alternatively function to measure changes in the (relative) bed height, which may be used to control actuation of the modular assembly (e.g., height control). The feeler wheel is preferably connected to the mount by a (rigid) frame structure, but can be otherwise implemented. As an example, the feeler wheel can be suspended relative to the implement frame (and/or a rigid frame structure mounted to the implement frame), where a set of integrated sensors can measure changes in the bed height based on the suspension displacement (e.g., based on rotation angle of a suspension element, spring force, etc.). Additionally or alternatively, the feeler wheel and/or support structure may not be utilized for sensing and/or feedback, such as in variants where changes in the bed height may be measured by time-of-flight sensors, depth imaging (e.g., via a stereo camera pair, range imaging sensors, etc.), and/or any other suitable sensor(s) of the modular assembly. For example, variants can additionally or alternatively detect bed height and/or bed height changes using: LIDAR, Radar, stereo imaging, and/or any other suitable (non-contact) data collection methods.

However, the assembly module(s) can include any other suitable feeler wheel(s) and/or can be otherwise integrated.

The set of actuators 210 function to dynamically control the height of the assembly module and components thereof (e.g., sensors; lighting components; arm and/or effector mount structures, which may control blade depth; etc.) relative to the surface of the bed. Additionally or alternatively, the set of actuators can otherwise function to adjust and/or configure the assembly module relative to the implement frame. The set of actuators can include one or more: electromechanical actuator (e.g., motor, linear actuator, solenoid, etc.), hydraulic actuator (e.g., a hydraulic cylinder), pneumatic actuator (e.g., pneumatic cylinder); and/or any other suitable actuation mechanism(s), which can include a linear and/or rotational actuation output/stroke (and/or a combination thereof; 2D actuation output; 3D actuation output via a set of linkage, etc.). Actuators can be powered: electrically (e.g., servo or motor actuation), pneumatically, hydraulically, and/or otherwise suitably powered. The actuation input provided by the actuator can be linear, rotational, or a combination thereof. The actuator can act in a single direction (e.g., with an opposing spring-loaded return; single acting) or bi-directionally (e.g., powered in both directions along an actuation axis; double acting). The actuator can have a single actuation end (e.g., with an opposing end fixedly mounted) or two actuation ends (e.g., actuating in opposite directions and centrally mounted between the actuation ends). As an example, the actuator can be a linear actuator (e.g., providing a linear actuation stroke as an actuation input). As a second example, the actuator can be an electric motor (e.g., providing a rotational actuation as an input and/or a combined rotation/translation as an actuation input). The actuator(s) can be communicatively coupled to the controller (e.g., electrical communication; fluid communication; etc.) and/or powered by the controller, a centralized power source, and/or onboard vehicle power source. In variants, the actuators can be a hydraulic actuator driven by hydraulic pressure within a fluid line (e.g., selectively coupled to a pressurized chamber with electronically actuated valves, such as solenoid valves, controlled with the controller; PTO-powered hydraulics; etc.). Actuation can be controlled with feed-forward and/or feedback control elements, dynamically and/or automatically controlled, controlled according to a set of predetermined actuation parameters (e.g., based on a manual setting at an HMI and/or a predetermined configuration of the system), static, variably controlled, indirectly controlled, uncontrolled (e.g., not directly controlled), and/or otherwise controlled in various configurations of the system. However, the actuator(s) can be otherwise suitably actuated/adjusted.

The actuators are preferably controlled by controller 210, such as based on sensor data (e.g., bed height deviations) and/or individual plant-detections determined therefrom (e.g., computer vision based on perception data). Accordingly, real-time actuation responses (e.g., to crop detections) are preferably autonomously controlled by the controller 210. Additionally or alternatively, actuator control parameters can be modified based on inputs received from a Human Machine Interface (HMI), which may allow operator adjustments of plant-level actions and/or to control/adjust physical aspects of the system (e.g., for the entire system and/or on a per module/row basis). For instance, manual movements of hardware actuation can be adjusted via HMI (e.g., mode changes, physical movements, effector control features layered on top of perception). As an example, the system, actuation, perception, and/or control can be adjusted to accommodate crop singles, doubles, ground cover crops, and/or any other suitable bed configurations (e.g., such as via automatic detection and/or HMI input). Additionally or alternatively, variants of the system can facilitate automatic switching of models, actuator control parameters, and/or other HMI parameters based on prior knowledge of the field, such as based on historical configuration/inputs, geo-location, and/or other data. In one set of variants, the system can facilitate data collection and corresponding automatic and/or manual adjustment (e.g., via an HMI) of any of the control parameters and/or variables as described in U.S. application Ser. No. 17/100,773, filed 20 Nov. 2021, titled "METHOD FOR ANALYZING INDIVIDUAL PLANTS IN AN AGRICULTURE FIELD", and/or U.S. application Ser. No. 17/079,251, filed 23 Oct. 2020, titled "METHOD FOR AUTONOMOUSLY WEEDING CROPS IN AN AGRICULTURAL FIELD", each of which is incorporated herein in its entirety by this reference.

Figure 10:
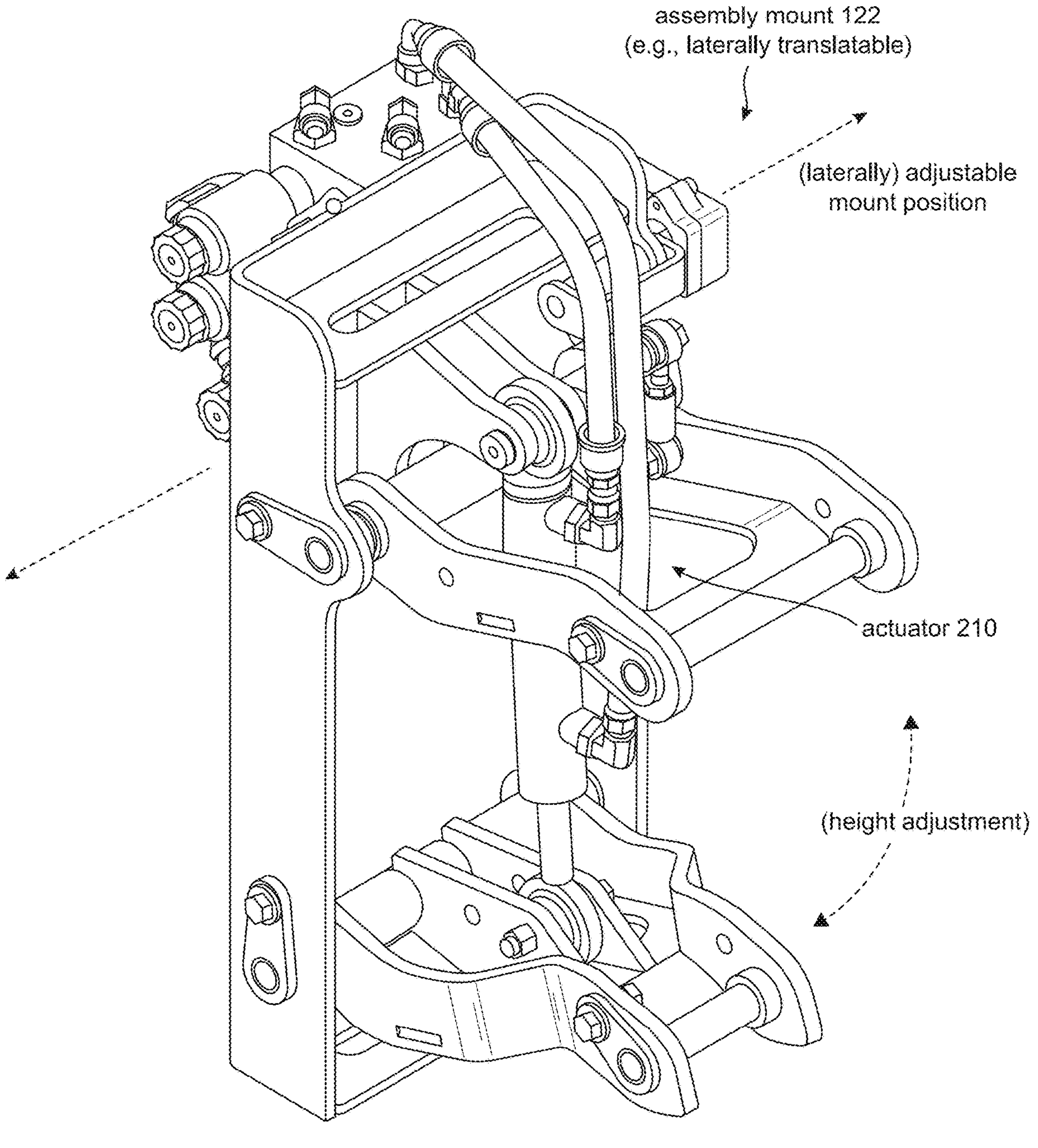
FIG. 10 is a trimetric view of an example of a (translatable) assembly mounting structure in one or more variants of the system.

In a first example, the set of actuators can include actuator integrated with and/or coupled to the mount (e.g., at the mechanical connection with the implement frame; an example is shown in FIG. 10) and configured to transform a frame of the modular assembly (and all components thereof) relative to the implement frame. Accordingly, the height of each modular assembly can be independently adjusted relative to the frame, which may account for deviations in the field along the width of the bed (e.g., lack of planarity, crowned/convex surface, sloped beds, mounds, etc.). In a second example, subsets of components of the assembly module can be separately and/or independently actuated (e.g., controlling an angle of a camera and/or lighting system; adjusting a height of an effector mount; adjusting a height/angle of a single weeder sub-assembly; etc.). However, the assembly module can include any other suitable actuators, actuation mechanisms, and/or degrees of freedom.

Figure 13:
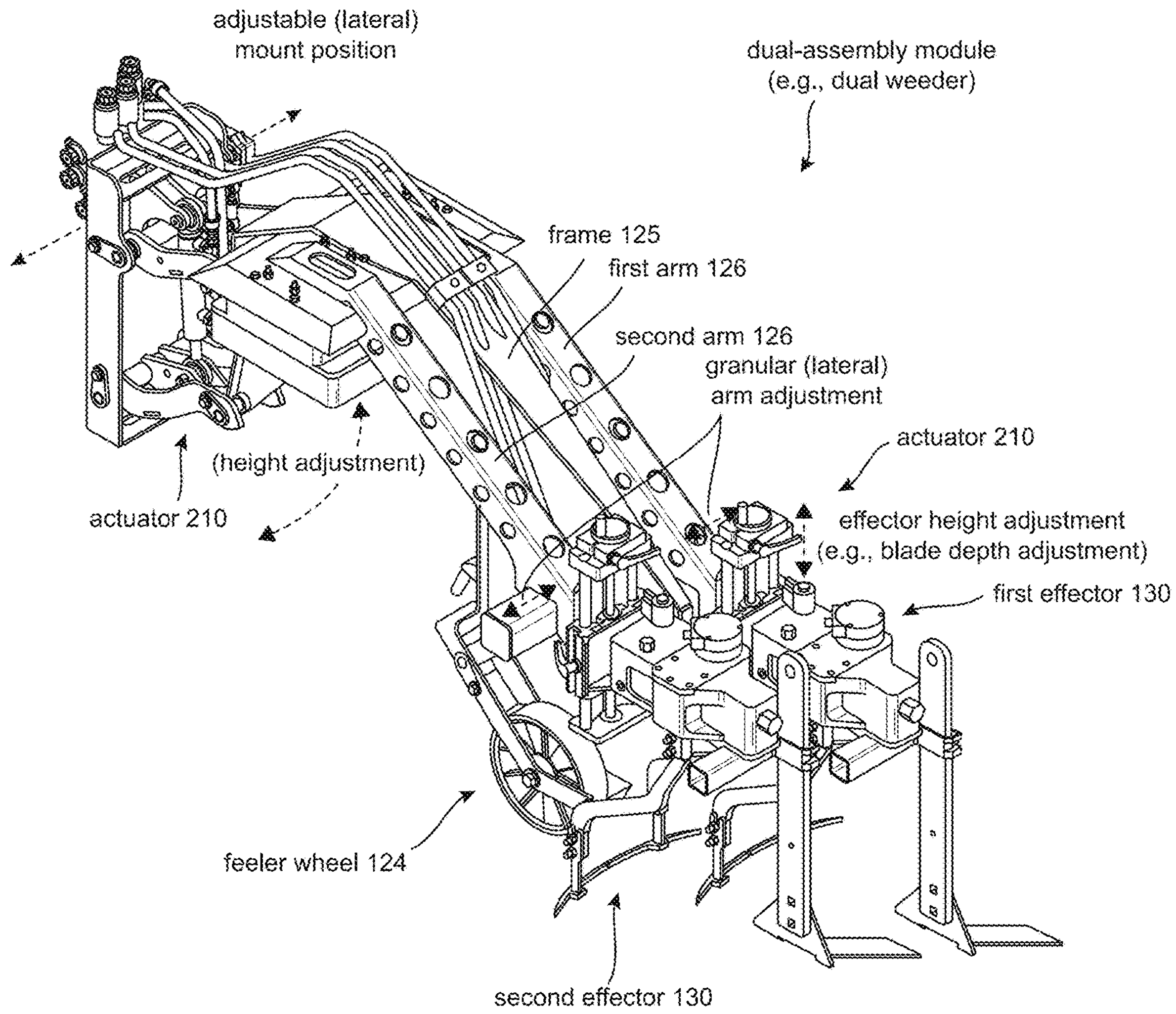
FIG. 13 is a trimetric view of a variant of a dual-assembly module in one or more variants of the system.

In variants, the set of actuators can include a first actuator coupling the assembly frame 125 of a modular assembly 120 to the implement frame 110 at a mount 122 (e.g., hydraulic cylinder; an example is shown in FIG. 10; a second example is shown in FIG. 13).

Figure 12:
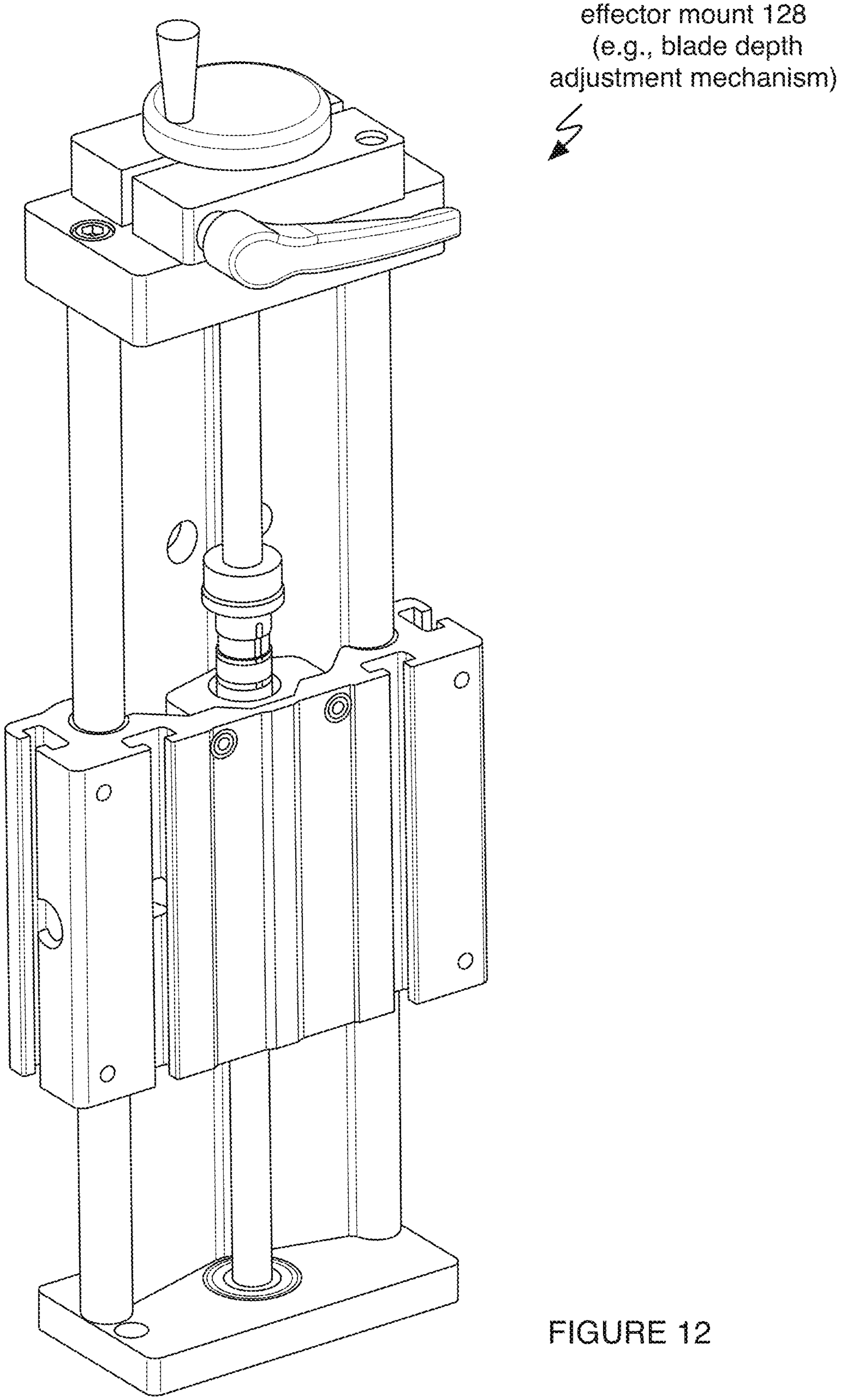
FIG. 12 is a trimetric view of an example of an effector mount in one or more variants of the system.

In variants (e.g., a first example is shown in FIG. 12; a second example is shown in FIG. 13), the set of actuators can include a second actuator coupling an effector mount 128 to the assembly frame 125 (and/or an arm adjustably mounted thereto).

However, the assembly module(s) can include any other suitable actuator(s) and/or can be otherwise configured.

The set of sensors 220 functions to collect perception data which can be used to facilitate automatic control of the effector(s). Additionally or alternatively, the set of sensors can collect plant-level data which can be used to monitor crops (e.g., individually) within a field. Additionally or alternatively, the set of sensors can function to measure changes in the (relative) bed height, which can be used to control the set of actuators.

The set of sensors can include: perception sensors (e.g., cameras, time-of-flight sensors, etc.), cameras (e.g., RGB), LIDAR, stereo camera pairs, multi-spectral cameras, hyperspectral cameras, CCD cameras, CMOS cameras, time-of-flight sensors (e.g., Lidar scanner, etc.), a range imaging sensors (e.g., stereo triangulation, sheet of light triangulation, structured light scanner, time-of-flight, interferometry, etc.), environmental sensors (e.g., temperature, pressure, humidity, etc.), location sensors (e.g., GPS/GNSS), wheel sensors (e.g., feeler wheel encoder), position/displacement sensors, proximity sensors, encoders (e.g., absolute/relative; arm angle encoder), resolvers, suspension sensors (e.g., force sensing, displacement sensing, weight sensing, etc.), external antennas (e.g., GPS, cellular, Bluetooth, Wi-Fi, Near Field Communication, etc.), diagnostic sensors, effector sensors (e.g., blade depth feedback, effector height sensing, etc.) and/or any other suitable set of sensors. The sensors can be arranged into sensor arrays (e.g., camera array) and/or not arrayed (e.g., single RGB camera). Perception sensors are preferably calibrated within a predetermined pose and/or coordinate frame (e.g., where the pose of perception sensors is substantially maintained relative to the ground by dynamic actuation) and/or can be substantially maintained in a fixed/predetermined arrangement relative to the surface of the bed. Alternatively, perception data can be pre-processed and/or post-processed to adjust for changes in the height and/or angle of the sensors relative to the bed, such as by bundle adjustment (e.g., minimizing the reprojection error between the pixel locations of observed and predicted image points), homography, and/or other suitable image processing and/or pose estimation techniques.

In a first example, the set of sensors can include one or more cameras with a gravity-aligned field-of-view (e.g., nadir viewing; oriented vertically downward; 'top-down' field of view; an example is shown in FIG. 18B), which is substantially orthogonal to a top surface/plane of the bed. In this example, the set of actuators can be dynamically controlled to substantially maintain the height (and/or pose) of the cameras relative to the ground. The height of the camera(s) can be: less than 25 cm, 25 cm, 50 cm 55 cm, 55 cm, 60 cm, 65 cm, 70 cm, 75 cm, 85 cm, 100 cm, 125 cm, 200 cm, greater than 200 cm, any open or closed range bounded by the aforementioned values, and/or any other suitable height; which may advantageously facilitate high-resolution 'crop-level' perception, without adversely increasing the size, footprint, and/or weight (e.g., as a function of height). Moreover, perception with nadir-viewing camera(s) may simplify image processing and/or improve CV-analysis as it may inherently reduce the various sources of error (e.g., projection errors, lighting differences, etc.). Additionally or alternatively, perception via cameras with a midsagittal plane substantially aligned with a row of crops (e.g., a central axis of camera intersects crop row line; crop row and/or individual crops therein generally lie along midsagittal 'centerline' of each image frame).

Figure 18A:
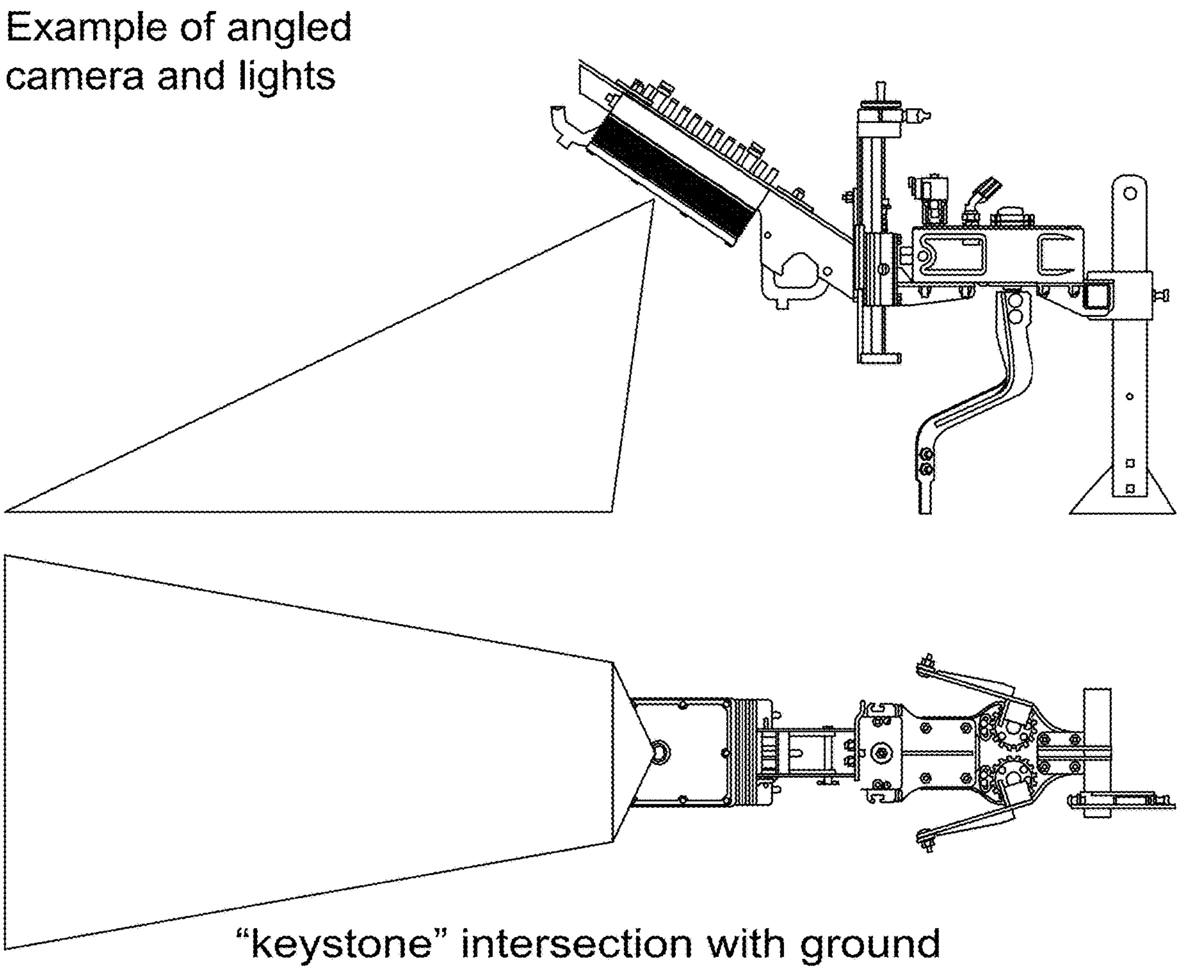
FIG. 18A illustrates side and bottom view of an example arrangement of a perception system in one variant of the system.
Figure 18B:
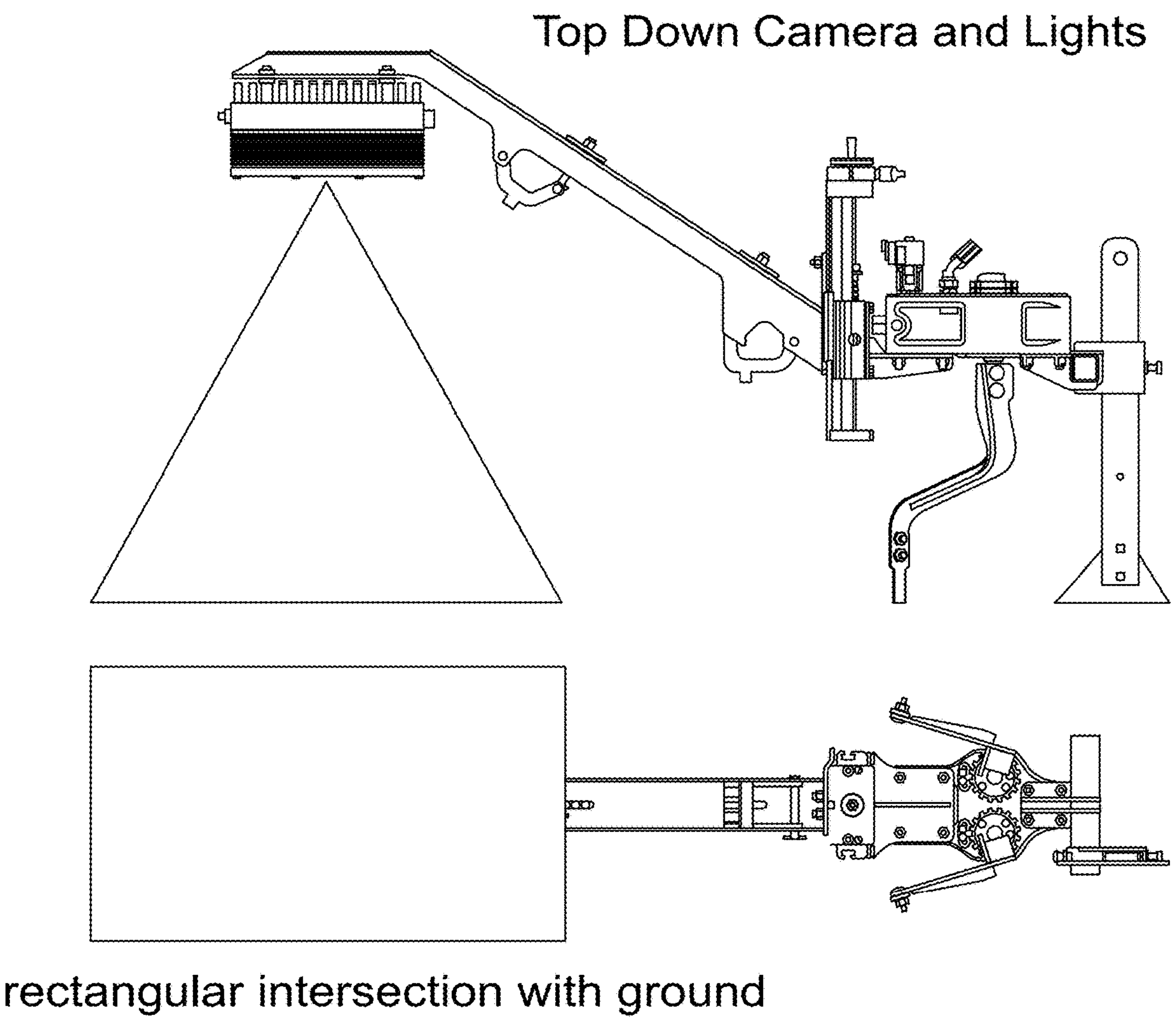
FIG. 18B illustrates side and bottom view of an example arrangement of a perception system in a second variant of the system.
Figure 18C:
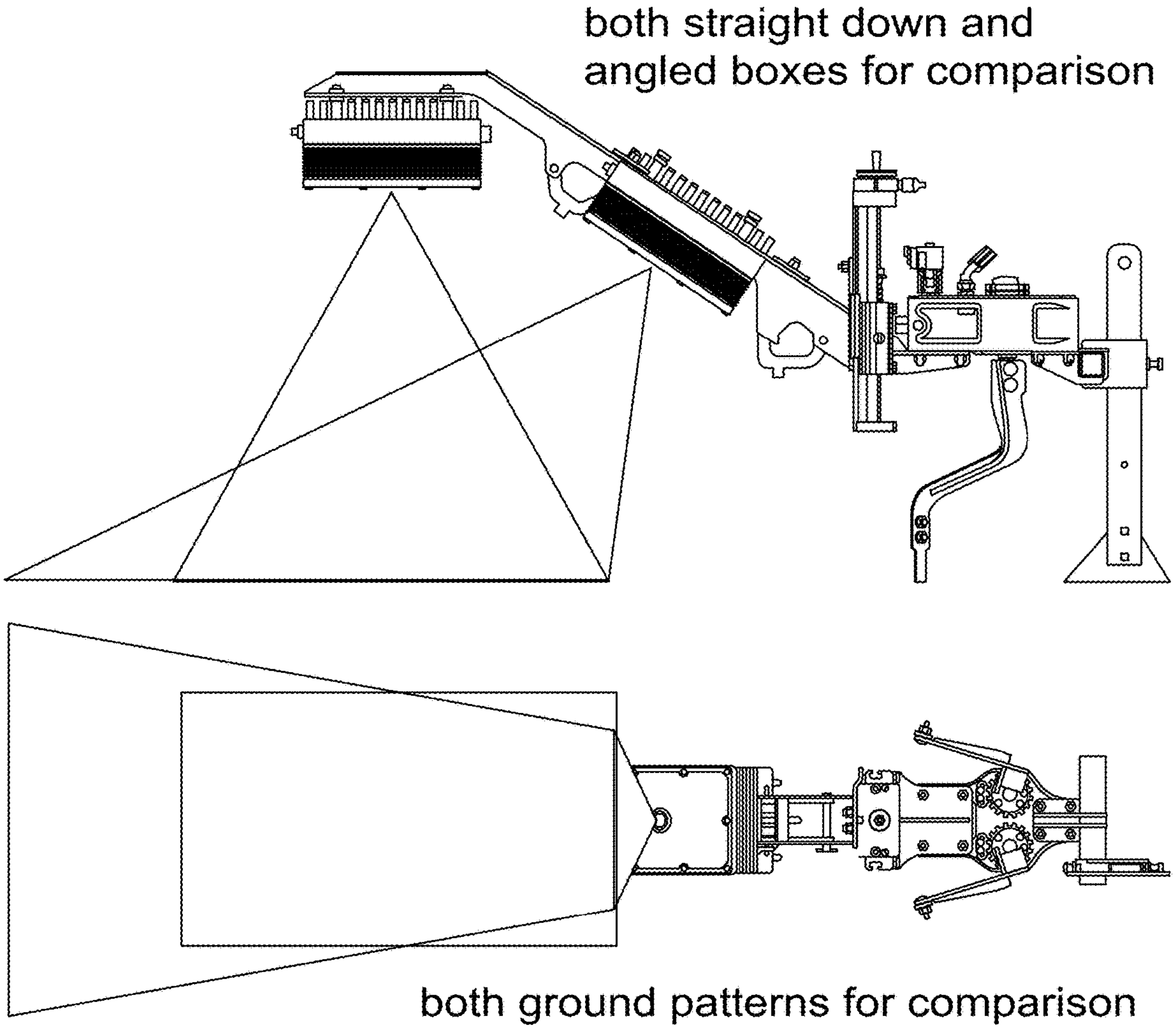
FIG. 18C illustrates side and bottom view of an example overlay which compares the first variant of FIG. 18A and the second variant of FIG. 18B.
Figure 19:
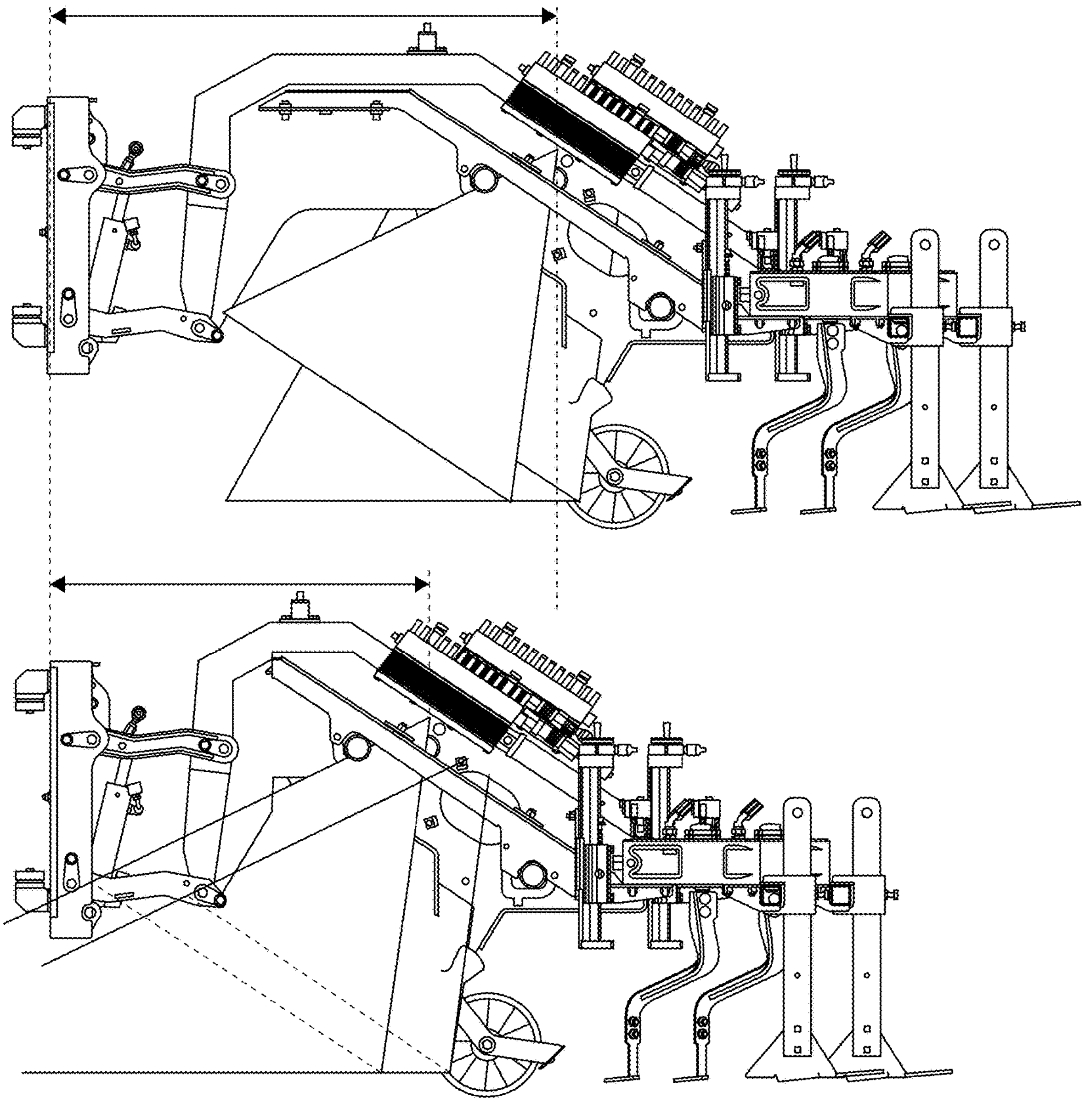
FIG. 19 is an example arrangement of a perception system in one variant of the system.

In a second example, the cameras can be angled forwards (e.g., towards a forward horizon line relative to nadir view; an example is shown in FIG. 18A), which may advantageously increase the longitudinal span of the field of view (e.g., increasing the number of frames capturing a given plant; an example comparison is shown in FIG. 18C), thereby reducing the height and/or length of the system (e.g., an example is shown in FIG. 19) to capture the same volume of perception data, may reduce the overall vehicle mass and footprint.

In a third example, the sensor suite can include the sensors and/or the sensor integration with a unitary perception, lighting, and control module as described in U.S. application Ser. No. 18/435,730, filed 7 Feb. 2024, titled "CROP DETECTION SYSTEM AND/OR METHOD", which is incorporated herein in its entirety by this reference.

However, the system can include any other suitable set of sensors and/or cameras in any suitable arrangement(s).

The controller 240 can function to automatically control the effector(s) based on the sensor data collected by the set of sensors. Additionally, the controller can function to dynamically control the actuator to maintain the height of the sensors (and/or effector) relative to the bed (e.g., based on measurements collected by the set of sensors). Additionally, the controller can function to analyze perception data, and/or perform any other suitable set of functionalities.

The controller preferably receives sensor data from the set of sensors 220, but can additionally or alternatively operate based on data inputs (e.g., sensor data, control parameters, etc.) from other controllers of the system, a central controller, and/or any other suitable inputs. The controller can detect crops (e.g., meristem positions) with a set of models, from which the controller determines control instructions for the set of actuators and/or an effector(s). The controller preferably detects individual crops within a single row, but can additionally or alternatively be configured to detect weeds, crop doubles, ground cover plants, and/or any other suitable objects. Additionally or alternatively, the controller can be configured to determine deviations in crop bed height, (e.g., relative to a furrow) based on the sensor data (e.g., furrow wheel sensor; range imaging sensor such as a stereo camera pair; etc.); and dynamically control height actuation of the respective module and/or an actuator thereof based on the deviations in crop bed height. Additionally or alternatively, the controller can communicate with and/or control the effector to facilitate agriculture operations based on the crop detections (e.g., inter-row agriculture operations, intra-row agriculture operations, etc.).

In a first set of variants, the controller can include set of models, such as an object detection (and/or object tracking) model (e.g., YOLO, RCN, etc.), object classification model, localization model, and/or any other suitable set of models. The models can include classical or traditional approaches, machine learning approaches, and/or be otherwise configured. The models can include regression (e.g., linear regression, non-linear regression, logistic regression, etc.), decision tree, LSA, clustering, association rules, dimensionality reduction (e.g., PCA, t-SNE, LDA, etc.), neural networks (e.g., CNN, DNN, CAN, LSTM, RNN, encoders, decoders, deep learning models, transformers, etc.), ensemble methods, optimization methods, classification, rules, heuristics, equations (e.g., weighted equations, etc.), selection (e.g., from a library), regularization methods (e.g., ridge regression), Bayesian methods (e.g., Naiive Bayes, Markov), instance-based methods (e.g., nearest neighbor), kernel methods, support vectors (e.g., SVM, SVC, etc.), statistical methods (e.g., probability), comparison methods (e.g., matching, distance metrics, thresholds, etc.), deterministics, genetic programs, and/or any other suitable model. The models can include (e.g., be constructed using) a set of input layers, output layers, and hidden layers (e.g., connected in series, such as in a feed forward network; connected with a feedback loop between the output and the input, such as in a recurrent neural network; etc.; wherein the layer weights and/or connections can be learned through training); a set of connected convolution layers (e.g., in a CNN); a set of self-attention layers; and/or have any other suitable architecture.

Models can be trained, learned, fit, predetermined, and/or can be otherwise determined. The models can be trained or learned using: supervised learning, unsupervised learning, self-supervised learning, semi-supervised learning (e.g., positive-unlabeled learning), reinforcement learning, transfer learning, Bayesian optimization, fitting, interpolation and/or approximation (e.g., using gaussian processes), backpropagation, and/or otherwise generated. The models can be learned or trained on: labeled data (e.g., data labeled with the target label), unlabeled data, positive training sets (e.g., a set of data with true positive labels, negative training sets (e.g., a set of data with true negative labels), and/or any other suitable set of data. In a specific example, models can be trained using historical data collected from the same camera pose/orientation (e.g., for a specific crop; from prior operation of the implement; etc.).

Any model can optionally be validated, verified, reinforced, calibrated, or otherwise updated based on newly received, up-to-date measurements; past measurements recorded during the operating session; historic measurements recorded during past operating sessions; or be updated based on any other suitable data.

Any model can optionally be run or updated: once; at a predetermined frequency; every time the method is performed; every time an unanticipated measurement value is received; or at any other suitable frequency. Any model can optionally be run or updated: in response to determination of an actual result differing from an expected result; or at any other suitable frequency. Any model can optionally be run or updated concurrently with one or more other models, serially, at varying frequencies, or at any other suitable time.

However, the controller can include any other suitable model(s).

In a second set of variants, non-exclusive with the first, the controller can facilitate localization/tracking of crops based on the sensor data collected by the set of sensors, such as utilizing one or more of: SLAM, odometry, triangulation/trilateration, dead-reckoning, and/or any other suitable techniques.

In a third set of variants, the controller can automatically control the set of actuators and/or effector (and/or actuators thereof) based on plant-level detection/tracking. For example, the controller can control the blade actuator to open and close the effector blades around a plant to facilitate mechanical weeding around the plant (e.g., an example is shown in FIG. 14), based on the detected location.

In a fourth set of variants, the controller can perform plant-level analytics of a line of crops. For example, the controller can perform all or a portion of the method(s) and/or analyses as described in U.S. application Ser. No. 16/539,390, filed 13 Aug. 2019, which is incorporated herein in its entirety by this reference.

The controller and/or processing thereof is preferably local (e.g., at the modular assembly; commonly housed with the perception sensors and/or lighting system; facilitating edge processing/compute), but can additionally or alternatively be separate from the assembly module and/or any suitably portion of the processing can be remote, distributed, or otherwise arranged relative to any other system or module. The controller can include or be used in conjunction with one or more: CPUs, GPUs, custom FPGA/ASICS, microprocessors, servers, cloud computing, and/or any other suitable components.

The control communications can be provided between any suitable endpoints via any suitable communication protocols, such as CAN, TIM (e.g., Tractor Implement), Ethernet, Bluetooth, and/or any other suitable communication protocols.

However, the system can include any other suitable controller.

The lighting system 230 functions to illuminate the bed within the field of view of the cameras, which may mitigate the influence of ambient lighting factors on data perception data and/or analysis. The lighting system is preferably configured to provide substantially homogeneous lighting across the field of view of the sensors/cameras (e.g., with an array of angled LEDs), but can be otherwise configured. The lighting system of each module is preferably configured to provide greater/brighter illumination than the maximum solar illumination, but can be otherwise configured. For example, the lighting system can provide: less than 100 k lux, 150 k lux, 200 k lux, 250 k lux, 300 k lux, 320 k lux, 350 k lux, 400 k lux, greater than 400 k lux, any open or closed range bounded by the aforementioned values, and/or any other suitable illumination.

However, the modular assembly can include any other suitable lighting system(s).

In variants, the system is preferably configured with a lighting system and a set of perception sensors (e.g., one or more cameras) aligned with each line of crops in a bed. For example, the lighting system and the set of perception sensors are preferably adjustably mounted relative to the structural frame of the modular assembly, such as along a lateral bar/rail, which can allow for (infinitely) variable granular adjustments of the lateral position relative to the structural frame and/or furrow wheel (e.g., finer adjustment than may be achieved via the mount and/or shift frame; allowing individual adjustment to achieve 1:1 alignment with a row of crops).

Figure 5:
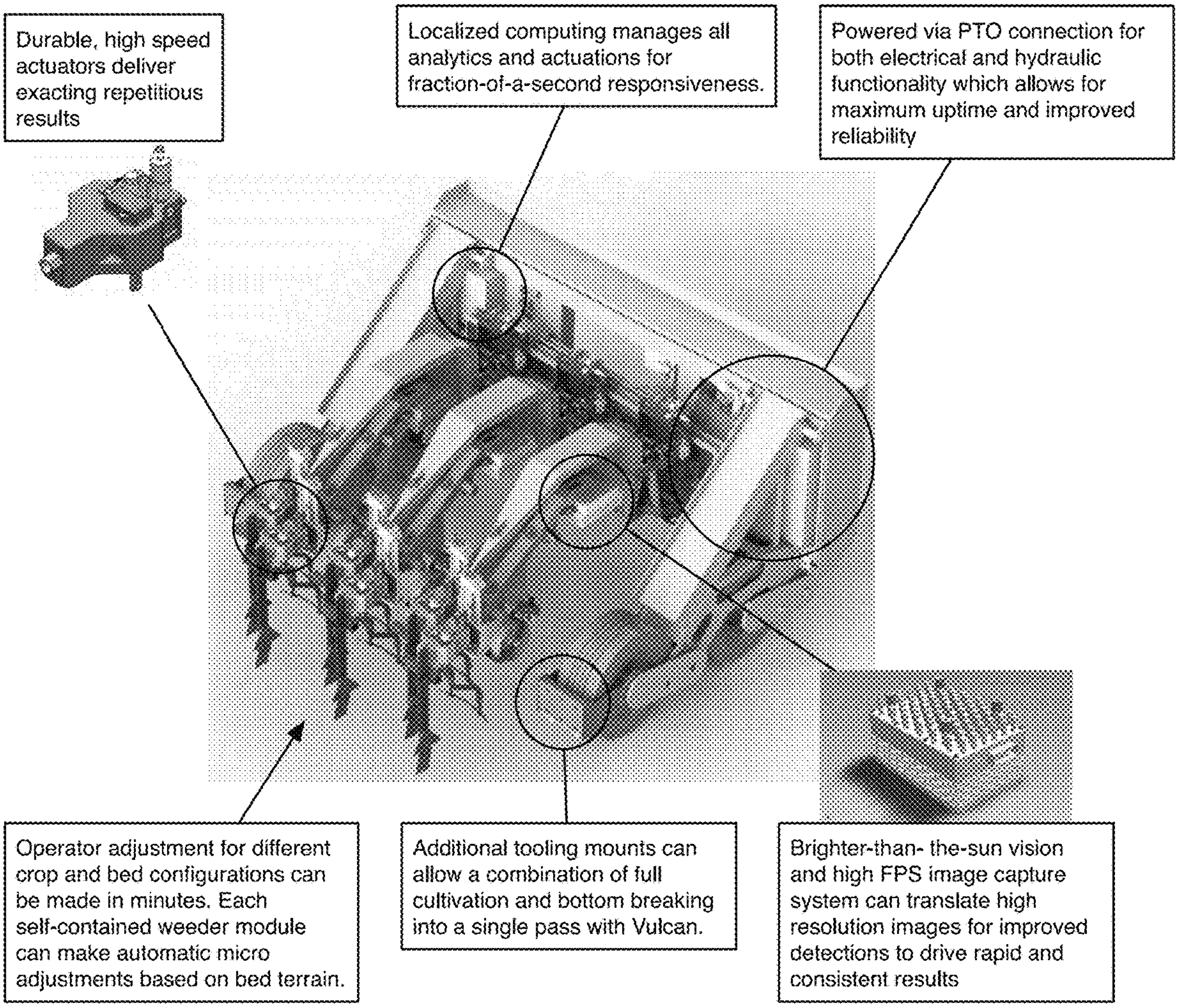
FIG. 5 is a diagrammatic example of a variant of the system.
Figure 6:
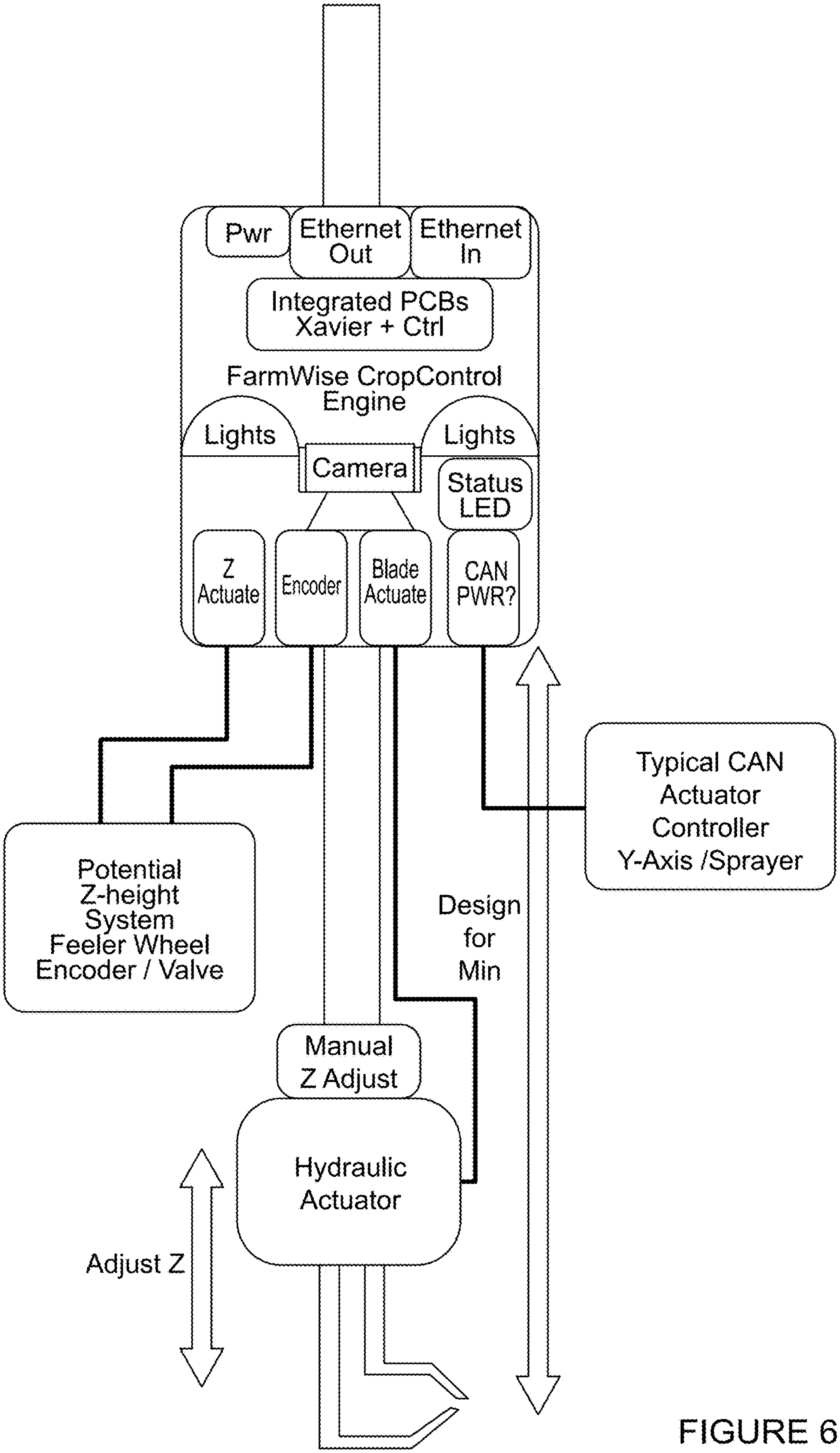
FIG. 6 is a schematic diagram of an example of an arm in one or more variants of the system.

In one set of variants, the sensors (and/or perception sensors), lighting system, and/or controller can be cooperatively housed within and/or integrated into a single enclosure (e.g., an example is shown in FIG. 5; a second example is shown in FIG. 6). For example, the arrangement of the enclosure can be adjusted to align with a respective line/row of crops in one or configurations of the system.

In variants, adjacent lighting systems can be configured such that the illuminance minimally overlaps (e.g., substantially no overlap between adjacent lighting systems), such as by efficient lens design (e.g., reducing photon loss outside of camera FOV; diminished edges), at least partially offsetting adjacent lighting systems (and corresponding perception systems) the system (e.g., between adjacent modules and/or within a dual-assembly; laterally, longitudinally, etc.), masking illumination, providing lighting illumination asynchronously (e.g., where high intensity illumination strobes may be provided over approximately 1 millisecond intervals, which may be controlled to be asynchronous for adjacent modules; strobes can be time-shifted with a duty cycle of approximately 0.3%), and/or otherwise minimizing the cross-module influence of adjacent lighting systems. For example, modules and/or lighting system can be time-synchronized to contemporaneously operate with a common framerate, and/or can implement a time-shift approach where the adjacent/neighboring modules (e.g., alternating odd vs even units; adjacent modules) operate with a time offset (e.g., greater than strobe length; less than 3 milliseconds, 3 milliseconds, 5 milliseconds, 8 milliseconds, 12 milliseconds, 16 milliseconds, greater than 16 milliseconds, etc.) so strobes are asynchronous.

Modules can operate fully independently, synchronously (e.g., time-synced frame rate), asynchronously (e.g., frame time-shift; with same or different framerate), contemporaneously, and/or with any other suitable timing or relationship. For example, modules can be coordinated with a central computer and/or master controller to synchronize framerate and optionally manage strobe and/or imaging time shifts between modules.

However, the system can include or be used in conjunction with any other suitable modular assemblies.

Modular assemblies can be associated with (and/or facilitate agriculture operations for) a single line/row of crops and/or multiple rows of crops. For example, the modular assembly can include unitary enclosure housing a perception package, lighting system, and a controller, wherein the controls an effector to perform farming operations for the line of crops. In a second example, a modular assembly can include a pair of sub-assemblies (e.g., on either side of the feeler wheel; a dual assembly).

However, the system can include any other suitable components.

3.2 Additional Components

The system can optionally include or be used in conjunction with a vehicle 102, which functions to operate and/or maneuver the implement frame to facilitate weeding and/or other system operations. Additionally, the vehicle can supply power (e.g., high voltage, low voltage, etc.), pressurized working fluid (e.g., hydraulics, pneumatics, etc.), and/or other resources to system components (e.g., LTE/wireless data, etc.). The vehicle is preferably a tractor or other high-torque/low-speed vehicle, which provides power and tractive effort to mechanize agricultural tasks (e.g., weeding), but can be any other suitable vehicle, such as a manned vehicle (e.g., which may house a human driver), unmanned vehicle (e.g., teleoperated, semi-autonomous or fully autonomous vehicle), land-vehicle, diesel vehicle, internal combustion engine (ICE) vehicle, electric vehicle (EV), hybrid-electric vehicle, and/or any other suitable type of vehicle. The vehicle may provide propulsion (tractive effort), steering, and/or power independently of the implement operation; and, likewise, the remaining components of the system can operate substantially agnostic to the vehicle/tractor deployed during operation.

As an example, the system can be compatible with industry-standard tractors (e.g., with 60 to 84 inch-bed flexibility, 1 to 8 lines, quick/easy crop line configuration changes, etc.) and can include: Category II three-point hitch attachment (e.g., which may facilitate installation and/or removal within 20 minutes), power take-off (PTO)-powered hydraulics, and/or can otherwise interface with existing tractors/farming equipment.

However, the system can include or be used in conjunction with any other suitable vehicle(s).

Figure 3:
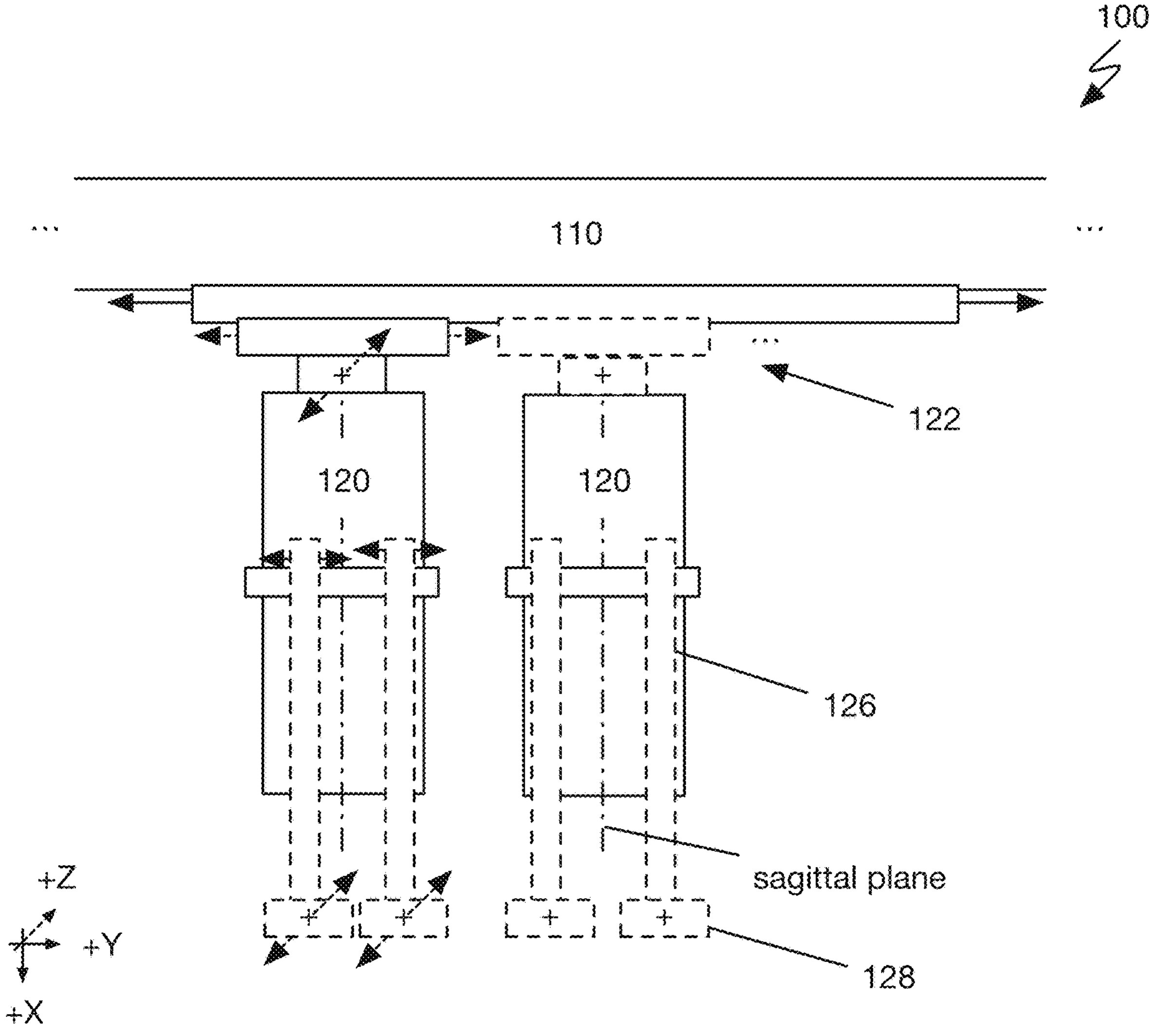
FIG. 3 is a schematic representation of a variant of the system, illustrating adjustable degrees of freedom of the implement.
Figure 11:
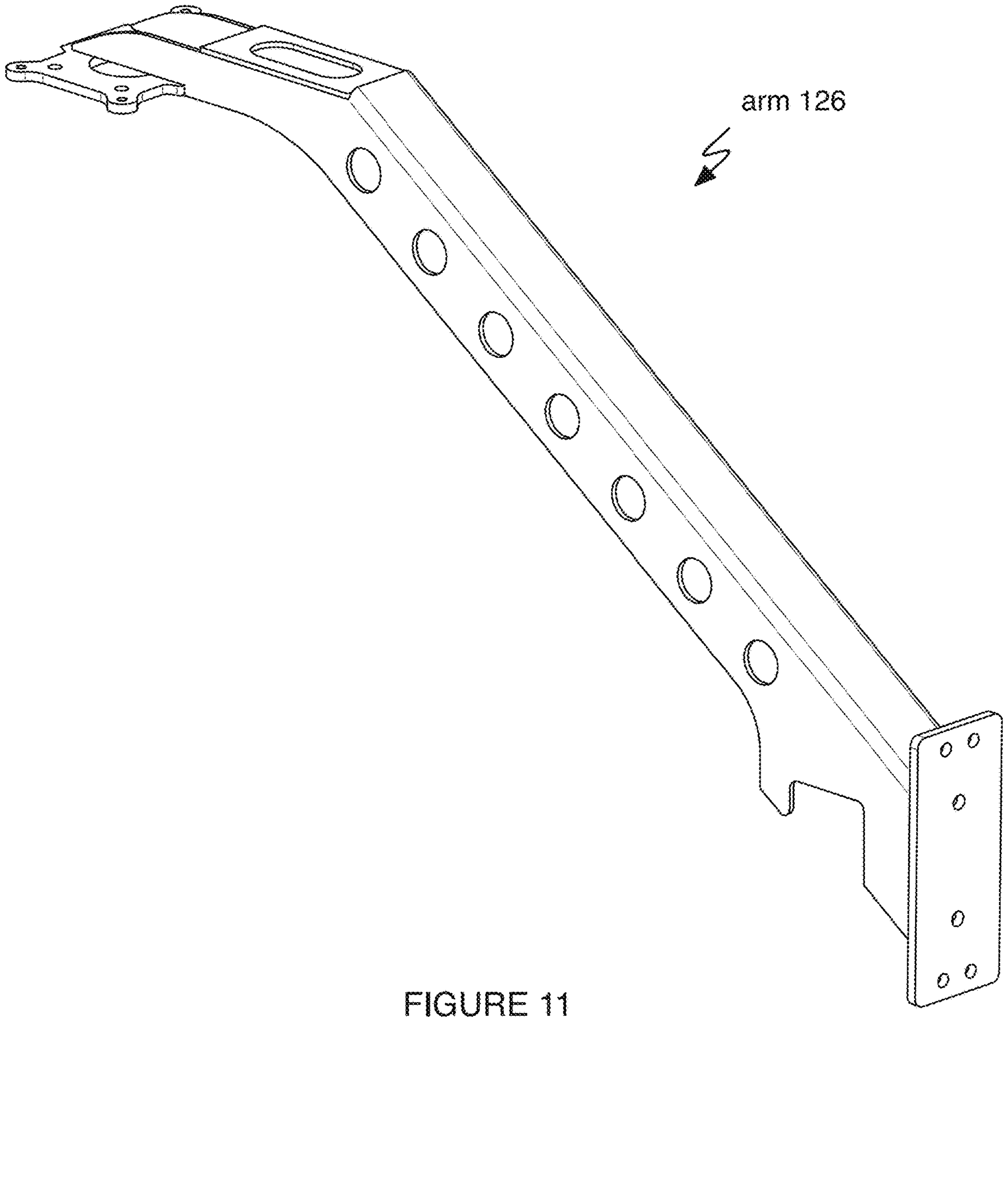
FIG. 11 is a trimetric view of an example of an arm in one or more variants of the system.

The system can optionally include or be used in conjunction with an effector 130 which functions to perform an agricultural operation (e.g., weeding, harvesting, spraying, tilling, pest control, fertilization, etc.). The effector(s) is/are preferably adjustably mounted to the assembly module to facilitate vertical and/or lateral adjustments (e.g., relative to a base of the module). For example, the effector can be mounted to an arm 126 of the modular assembly (e.g., at an effector mount 128) which is laterally adjustable relative to the assembly frame 125 and/or feeler wheel 124 (e.g., slidable clamp; an example is shown in FIG. 3; a second example is shown in FIG. 11 and FIG. 13), which can allow granular lateral adjustments to align the effector with a line of crops. More preferably, the effector, lighting system, and/or lighting system are each mounted to an arm and aligned along a sagittal plane, wherein shifting the arm is granularly adjustable (e.g., infinitely, within a predetermined range of positions) orthogonal to the sagittal plane. As a second example, the effector can be mounted via a height adjustment mechanism (e.g., lead screw, ball screw, linear actuator, rail carriage, etc.; examples are shown in FIGS. 8, 12, and 13) which may allow the effector to be vertically raised and lowered relative to the assembly module (e.g., and the structural frame, arm, and/or feeler wheel thereof). For instance, wherein the effector includes a set of effector blades, the effector mount can facilitate vertical adjustment of the effector blades to vary the blade depth (e.g., from 0 inches to 3 inches, for example).

In one set of variants (e.g., 'weeder' variant), the effector can include an actuator 132 (e.g., hydraulic actuator, electromechanical actuator; 2D actuator, 3D actuator/linkage; rotary actuator, linear actuator, actuated linkage, etc.; less than 1 inch stroke length, 1 inch stroke length, greater than 1 inch stroke length, etc.), a set of blades 136, and a set of blade supports 134. For example, the effector can include a pair of blades which can be: front facing, rear facing, swept (e.g., forward, upward, rearward, etc.), straight, arcuate, tapered, untapered, and/or otherwise configured. The pair of blades is preferably configurable between a first position (e.g., 'closed'; wherein the blades may mechanically remove weeds/debris between them and/or along a span of each blade) and a second position (e.g., 'open'; wherein the blades may pass around the body of a plant without adversely damaging the plant). For example, the controller can be configured to control the actuator position to articulate the blades between the first and second positions to facilitate weed removal (e.g., inter-row; intra-row; etc.). Additionally or alternatively, the effector can be a weeder such as a crimper, roller, hoe, disc, tine, blade weeder, finger weeder, and/or any other suitable type(s) of weeder. In a second set of variants, non-exclusive with the first, the effector can include a fixed tool (e.g., fixed blade). In a third set of variants, the effector can include a dispersal system (e.g., herbicide/pesticide sprayer).

In one set of variants, the effector can optionally include a height/depth gauge (e.g., to indicate the depth of an effector blade, for example).

In one set of variants, the effector can be configured to distribute (e.g., spray) a dispersal agent, such as a crop protection chemistry, NPK fertilizer, solid agent (e.g., pellets), fluid agent (e.g., liquid, aerosol, etc.), and/or any other suitable dispersal agent(s), and/or the effector can include any other suitable dispersal system. For example, the assemblies can be collectively controlled to match a dispersal target (e.g., flow rate, gallons per acre, etc.), where the controllers of communicate with and regulates agent dispersion at a respective nozzle (e.g., by PWM, model-based control, etc.), and coordinates with each of the remaining controllers (e.g., shutoff timing, dispersal data, etc.) to achieve collectively the dispersal target. As an example, ten spray nozzles can be individually controlled based on plant detections in a respective row (e.g., by a respective module/controller) and collectively coordinated (e.g., by the computing system of networked controllers) to achieve a target flow rate (e.g., N gallons per acre).

In a specific example, each effector can include an actuator (e.g., hydraulic actuator) configured to selectively articulate a first blade and a second blade between: a first configuration, in which the first and second blades are laterally offset; and a second configuration for intra-row weed removal (e.g., with the blades closed; without a significant lateral offset).

However, the system can operate in conjunction with any other suitable effector(s); or, alternatively, the system and/or modular assemblies thereof can be configured without an effector(s) in one or more configurations (e.g., such as a data collection mode, for example; where one or more modular assemblies is not utilized based on the bed configuration, etc.).

In variants, the system can optionally include or be used in conjunction with a human machine interface (HMI), which functions to facilitate feedback provision and/or manual adjustment/customization of the system configuration. For example, the HMI can facilitate manual control of various adjustments, which can include automated: blade depth adjustment (e.g., opening width, stem clearance, etc.), implement frame adjustment, deployment of implement wing extensions, frame height adjustment (e.g., based on bed height and/or furrow depth), and/or any other suitable manual control(s) of implement degrees of freedom. Additionally, the HMI can provide feedback which can include: vehicle state data, sensor/perception feedback (e.g., images), location data, diagnostics, effector feedback (e.g., blade position), verification/validation images, and/or any other suitable user feedback provisions. Alternatively, the HMI can be altogether excluded and/or otherwise integrated. For example, the HMI can be removably arranged within a vehicle cab (e.g., wherein the HMI may be selectively utilized or removed). In one example, the HMI can include the verification/validation feedback and/or other aspects described in U.S. application Ser. No. 16/267,362, filed 4 Feb. 2019, and/or U.S. application Ser. No. 17/079,251, filed 23 Oct. 2020, each of which is incorporated herein in its entirety by this reference.

In variants, the human machine interface (HMI) can be communicatively coupled to the computing system (e.g., central controller and/or each module controller) and configured to modify a set of plant-level parameters (e.g., plant level weeding parameters), wherein each controller is configured to autonomously control an actuator of the respective assembly based on the set of plant-level parameters (e.g., effector height adjustment, such as to set a weeding blade depth; effector control adjustments, etc.). For example, the HMI can facilitate actuation adjustments (e.g., for effector 130 and/or the set of actuators 210) with respect to plant-level parameters, such as: actuation speed, meristem clearance distance, blade depth, blade opening width, module height, and/or any other suitable plant level parameters. Additionally or alternatively, the HMI can configure the system and/or actuators for field-level parameters, such as furrow depth, bed parameters (e.g., bed width, number of rows, row spacing, bed height, etc.), and/or any other suitable parameters).

In some variants, the HMI can surface plant-level data and/or (aggregate) field data generated during agriculture operation and/or subsequent processing. For example, various plant-level analyses and/or field aggregates can be performed (e.g., via remote or cloud processing) on data wirelessly received from the system (e.g., via WiFi, cellular/LTE connections, etc.). As an example, images and/or plant detections across the modules can be aggregated and stitched together to yield larger swath views of a field (e.g., along with individual plant localization/data and/or aggregate field analyses/data).

Alternatively, the system can operate without the HMI, otherwise facilitate tele-operation adjustments/control, and/or otherwise provide data feedback in any other suitable formats.

3.3 Computing

In variants, the system can include or be used in conjunction with a computing system, which can include a central computer (e.g., a 'Grand Central' computer) and/or a plurality of module controllers. The computing system and/or various computing operations thereof can be centralized, distributed (e.g., modularized), local, remote, and/or otherwise implemented. As an example, a central computer and/or a 'master' controller can control actuation of the implement frame, coordinate timing/communication across the controllers of the assembly modules, communicate with the vehicle (e.g., via CAN/LIN network communications), and/or facilitate I/O communication (e.g., with an HMI, with a remote server, with cloud computing resources, with external data storage, etc.). The computing system and/or the controller(s) thereof can include: one or more: CPUs, GPUs, custom FPGA/ASICS, microprocessors, servers, cloud computing, and/or any other suitable components. The controllers and/or elements of the computing system can be communicatively coupled in series, parallel, and/or any combination thereof (e.g., parallel/star configuration).

In a first example, a controller 240 of one modular assembly 240 (i.e., a master controller) can manage timing and communications for a remainder of the modular assembly controllers (i.e., slaves) of the system. In a second example, a centralized controller mounted to the implement frame can manage the edge controllers 240 at the modular assemblies.

The computing system preferably determines field data (i.e., plant-level or row level data), which can be used for agriculture operations (e.g., weeding, spraying, etc.) and/or non-generic analyses. Field data can include: individual plant detections (e.g., localized and/or indexed), meristem positions, segmented crop image(s) (i.e., crop bounding boxes), plant data, soil data, moisture data, localization data, ambient environmental data (e.g., temperature, humidity, sunlight intensity/brightness, etc.), and/or any other suitable data. Field data is preferably generated by each individual (modular) controller in real time (e.g., to facilitate actuation/control), but can additionally be determined by inter-row and/or inter-bed data aggregation/analysis, which can occur in real-time (or near-real time), contemporaneously with operation of the system 100 (e.g., periodically, aperiodically, such as in response to an HMI request or trigger condition, etc.), asynchronously with operation of the system 100 (e.g., subsequent analysis, such as via a remote computer or cloud processing, etc.), and/or with any other suitable timing/frequency. For example, aggregate field data can be analyzed and/or post-processed to generate field data (e.g., aggregate plant data, information on soil conditions, etc.; history of field growth/yield; etc.), such locally (e.g., the computing system and/or an individual controller[s] thereof), remotely (e.g., remote server, cloud processor, etc.), at a central compute node (e.g., gateway computer; master controller; etc.), via distributed processing, and/or with any other suitable computing architecture(s). Field data can be provided via an HMI (e.g., in real-time, near real time, and/or in response to a trigger condition/request) and/or otherwise determined/stored.

However, the system can include any other suitable processing and/or computing implementation(s).

4. Variants

In variants, the system can provide robustness, accuracy, versatility, and/or simplistic user operation. The weeding system can include: a stand-alone control engine (a.k.a., a CropControl Engine; embedded in a crop scanner housing a vision stack); a precision actuation system with fine control (e.g., sub-inch precision) over blade actuation; and an implement to attach the CropControl Engine and actuation system(s) for use in a fields. The versatility of the CropControl Engine can be adaptable to a wide range of use cases, and can provide variability and customization at the implement level, with minimal additional integration effort. In variants, this system can provide "push and go" functionality for growers, allowing quick integration into various architectures.

In variants, weeding arms can be added or removed in under 20 minutes. Variants can be configured with a single- or a triple-bed—with the capacity to weed from 1 to 6 lines per bed. Variants configured as a single-bed can weigh under 3,500 pounds, which may enable the (lightweight) system to be used in wet conditions and pulled by industry-standard tractors.

In variants, the system can be modular which can facilitate the system to be scaled and/or reconfigured for a variety of weeding scenarios and/or bed configurations.

Variants can be modular and/or facilitate modular sensing, perception compute, and/or actuation.

In variants, end effectors (e.g., blades) can be longitudinally aligned with modular sensing (e.g., cameras) on each arm; and a projection of the end-effector-center-to-crop-box-center onto the ground can be substantially constant. In variants, blade depth can be adjustable (e.g., fixed during operation). In variants, blade open/close actuation can be continuous and software controlled. In variants, the system can include a surface height sensor, which can measure the ground height (e.g., topography). This measurement can be sent to the backplate-arm interface to adjust the end effector height. Variants can utilize standard interfaces (e.g., for communications, hydraulics, pneumatics, etc.).

In one set of variants, the system can include a control engine; a weeder module; and an implement. A weeder module can include: a crop scanning module; a weeder arm; a blade actuator; a blade adjustment mechanism; weeder frame; a shift frame; and/or any other suitable components. However, the system 100 can additionally or alternatively include any other suitable set of components. The system can function to facilitate automated and/or perception-based weeding (e.g., in a variety of lighting conditions).

In variants, the system can be compatible with industry-standard tractors (e.g., with 60 to 84 inch-bed flexibility, 1 to 8 lines, quick/easy crop line configuration changes, etc.) and can include: Category II three-point hitch attachment (under-20-min install & removal); PTO-powered hydraulics; adjustable blade actuation speed and ROM; and/or other reliability measures.

In variants, the system can be modular, which can allow: high-precision weeding around each individual crop; individual weeding module movement; consistent blade depth thanks to independent, automatic depth-sensing capabilities on each weeding module; and/or other modularity features. Variants can operate with an array of blades, suited for various crops and soil conditions. Variants can generate field data (e.g., crop count, spacing, and size distribution). Variants can support various crops, such as lettuces, celery, broccoli, cauliflower, cabbage, brussels sprouts, radicchio, and/or other crops.

Variants can include or be used with a tractor cab-mounted user monitor for easy operation, including feedback cameras for operator assurance. Variants can automatically set weeding blade depth, with global fine (e.g., sub-inch) adjustment. Variants may be used without requiring operator-dependent measurements/adjustments. Variants can be deployed with hands-off adjustments and setup (e.g., allowing for rapid training/onboarding of operators).

The Crop Scanner (i.e. CropControl Engine.) can be a standalone device which will house all computer vision & robotics software/hardware, drive our blade actuator, have collect & disseminate Z-Axis data & Visual Odometry, and/or collect data for growers dashboard. In variants, each scanner is preferably identical and platform-agnostic, which can allow flexibility to use it for different styles of actuation on future designs. The lighting for our computer vision system can be powerful enough that they can be used without any additional shading. Each Crop Scanner can include one or more: LED Lighting System, Camera, Embedded Computer Vision System, Ethernet Communication, Sensor Inputs, Power In, Weeder, and/or any other suitable components.

The Weeder Arm is preferably substantially rigid and houses the hardware components used for weeding. This can include the Crop Scanner, Feeler Wheel (e.g. ground surface sensor), Manual Blade Depth Adjustment, and Blade Actuator. The Weeder Arm attaches to the Shift Frame. On the Weeder Arm, the camera and the actuator blades can be directly aligned with each other to allow for robotics to monitor crop alignment and make adjustments in Y-Axis as needed.

The hydraulic blade actuator can have an adjustable blade width to accommodate different sizes of crops. The blade width can be adjusted dynamically during weeding and robotic actuation(s) can control the width to maintain an optimal width around crops as the global Y-Axis is actively shifted.

The weeder module can include a modular assembly that attaches to a Global Y-Axis bar. The weeder module can include the Shift Frame, Weeder Frame, Weeder Arm, Hydraulic Actuator, Cropscanner, and all minor components associated with those items.

A Shift Frame can attach to the Global Y-Axis bar and controls Z-Axis motion for the Weeder Module.

A Weeder Frame can attach to the Shift Frame and can function to provide structure that can mount the Weeder Arm.

A Weeder Arm can attach to the Weeder Frame. The arm can provide the rigid platform that mounts the Crop Scanner, Manual Z Adjustment, Hydraulic Actuator, and Fixed Blades.

In examples, the weeder arm can also include a ground surface sensor (e.g., feeler wheel; depth sensor; etc.), which functions to determine the ground level. The determined ground level can be used to adjust the height and/or pitch of the entire weeder arm to maintain the blades a predetermined depth within the surface of the ground, to maintain a constant distance between the crop scanner and the blades (e.g., wherein the distance is the length of a projection between the crop scanner and the blades onto the ground surface), and/or to maintain any other suitable setting.

In variants, verified/validated crops can be cultivated/weeded at a minimum vehicle speed of 1 mph (e.g., based on a minimum speed threshold that a standard tractor can achieve while maintaining the minimum PTO rpm that can run the system; blades can stay open for any speed below 1 mph).

The Implement for the system can attach to a tractor via a 3-point hitch. The overall design is preferably similar to a standard cultivation bar, but can be otherwise implemented. The implement can have an adjustable track width to accommodate beds ranging from 80 to 84 inches, additionally can be configured to accommodate bed heights ranging from 0-14.5 inches. The implement can have a diamond bar for attaching the Z-Axis Weeder Mount, an attachment point for Breaking Bottoms, and a global y-axis shifter which can be robotically controlled during weeding to maintain optimal alignment between the weeder blades and the crop lines. Additionally the implement can be an open design with no hood to cover weeding components.

As an example, the Implement can be a single bed implement, which can weigh less than 3000 lbs (e.g., less than 2500 lbs, between 2500 and 3000 lbs, etc.); accommodate bed height of 0-14.5"; operate with a Track Width of 80-84"; include or be used with a Global Y-Axis Shifter; include or be used with a Universal 3-Point Hitch; and/or can include any other suitable specifications.

However, the system can include any other suitable Implement.

In variants, the system can include or be used with a Human Machine Interface (HMI) that can allow users to start/track/stop weeding jobs, select crop models, adjust X-Axis margins, and view live diagnostics. Additionally, the HMI can have an emergency stop to stop all physical movement on the implement. The HMI can be powered using power from the implement and it will have a physical network connection to the GrandCentral computer.

In variants, the architecture can be deterministic, in order to monitor automatically how well the implement is set up by the operator. In particular blades can be in line with the camera precisely, and their opening and closing can be monitored via sensors. Coupling image detection, crop size detection, accuracy determination, speed quality, and/or looking at blade open/close performance (speed, amount it is opening, with blade selected), can allow detection of the arm alignment and monitoring of the actuator blade opening. Additionally, the implement can be an open design with no hood/shading of any kind over the weeders, which can allow for an operator to view quality from the cab of the tractor. However, the system can be otherwise configured.

However, the system can include any other suitable components.

Different subsystems and/or modules discussed above can be operated and controlled by the same or different entities. In the latter variants, different subsystems can communicate via: APIs (e.g., using API requests and responses, API keys, etc.), requests, and/or other communication channels.

Alternative embodiments implement the above methods and/or processing modules in non-transitory computer-readable media, storing computer-readable instructions that, when executed by a processing system, cause the processing system to perform the method(s) discussed herein. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), contemporaneously (e.g., concurrently, in parallel, etc.), or in any other suitable order by and/or using one or more instances of the systems, elements, and/or entities described herein. Components and/or processes of the following system and/or method can be used with, in addition to, in lieu of, or otherwise integrated with all or a portion of the systems and/or methods disclosed in the applications mentioned above, each of which are incorporated in their entirety by this reference.

As a person skilled in the art will recognize from the previous detailed description and from the figures and claims, modifications and changes can be made to the preferred embodiments of the invention without departing from the scope of this invention defined in the following claims.

We claim:

1. An agriculture implement comprising:
- an implement frame with a set of furrow wheels; and
- a plurality of weeder assemblies adjustably mounted to the frame, each weeder assembly comprising:
  - a modular frame comprising a proximal end and a distal end;
  - a proximal actuator mechanically coupled to the modular frame at the proximal end and the implement frame, the proximal actuator configured to adjust a height of the modular frame relative to the implement frame;
  - a set of sensors supported by the modular frame between the proximal end and the distal end, the set of sensors comprising a camera, a position of the camera defining a sagittal plane of the implement frame;
  - a lighting system proximal to the camera, wherein the sagittal plane intersects the lighting system;
  - an effector mount mechanically coupled to the modular frame at the distal end;
  - an effector attached to the effector mount, comprising:
    - a distal actuator, wherein the sagittal plane intersects the distal actuator; and
    - a blade mounted to the distal actuator; and
  - a controller communicatively coupled to the distal actuator and each sensor of the set of sensors, the controller configured to autonomously control the distal actuator based on sensor data collected by the set of sensors.

2. The agriculture implement of claim 1, wherein, in each weeder assembly, the camera, the lighting system, and the controller are packaged within a unitary housing.

3. The agriculture implement of claim 1, wherein each weeder assembly is configured to be coarsely adjusted along a lateral axis based on an arrangement of a crop bed.

4. The agriculture implement of claim 3, wherein the weeder assembly further comprises a third actuator mounted to the modular frame and configured to adjust a height of the effector mount, wherein the camera and the third actuator are each mounted to the modular frame by an arm and are aligned in a sagittal plane, wherein the arm is configured to be granularly adjusted along the lateral axis to align the sagittal plane with the crop row in the crop bed.

5. The agriculture implement of claim 1, wherein the controller of each weeder assembly of the plurality is configured to:
- determine deviations in crop bed height, relative to a furrow, based on the sensor data; and
- dynamically control the proximal actuator of the respective weeder assembly based on the deviations in crop bed height.

6. The agriculture implement of claim 5, wherein each weeder assembly of the plurality further comprises: a wheel suspended from the modular frame, wherein the set of sensors further comprises a wheel sensor coupled to the wheel, wherein the deviations in crop bed height are determined based on measurements from the wheel sensor.

7. The agriculture implement of claim 5, wherein the deviations in crop bed height are determined based on range imaging data.

8. The agriculture implement of claim 1, wherein the camera defines a camera field of view (FOV), wherein the lighting system is configured to provide substantially homogeneous illumination of the camera field of view (FOV).

9. The agriculture implement of claim 8, wherein an illuminance of the lighting system of each weeder assembly exceeds 150,000 lux.

10. The agriculture implement of claim 8, wherein an illuminance of adjacent lighting systems is configured to minimally overlap.

11. The agriculture implement of claim 1, further comprising: a central controller communicatively coupled to each controller of the plurality of weeder assemblies and configured to coordinate timing between the controllers.

12. The agriculture implement of claim 11, further comprising a human machine interface (HMI) communicatively coupled to the central controller and configured to modify a set of plant-level weeding parameters, wherein each controller is configured to autonomously control the distal actuator of the respective weeder assembly based on the set of plant-level weeding parameters.

13. The agriculture implement of claim 1, wherein the distal actuator comprises a hydraulic actuator configured to selectively articulate the blade and a second blade between:

a first configuration, in which the blade and the second blade are laterally offset; and a second configuration for intra-row weed removal.

14. The agriculture implement of claim 1, wherein at least one of the plurality of weeder assemblies further comprises:

a second effector arranged opposite the effector across a midsagittal plane of the modular frame; and a second camera arranged opposite the camera across the midsagittal plane.

15. The agriculture implement of claim 1, wherein the camera is positioned in a nadir-viewing arrangement.

16. A modular assembly for an agriculture implement, comprising:

a frame;

a first actuator mechanically coupled to the frame and configured to adjust a height of the frame relative to the agriculture implement;

a set of sensors supported by the frame, the set of sensors comprising a camera;

a lighting system proximal to the camera;

an effector mount mechanically coupled to the frame; and a controller communicatively coupled to each sensor of the set of sensors, the controller configured to autonomously control an effector based on sensor data collected by the set of sensors.

17. The modular assembly of claim 16, wherein, in each weeder assembly, the camera, the lighting system, and the controller are packaged within a unitary housing.

18. The modular assembly of claim 16, wherein the camera is positioned in a nadir-viewing arrangement.

19. The modular assembly of claim 16, wherein a sagittal plane intersects the camera, the lighting system, the effector mount, and the controller.

20. The modular assembly of claim 19, further comprising:

a second effector mount arranged opposite the effector mount across a midsagittal plane of the frame, the second effector mount defining a second sagittal plane;

a second camera;

a second lighting system; and a second controller communicatively coupled to the second camera and configured to autonomously control a second effector based on sensor data collected by the second camera, wherein the second sagittal plane intersects the second camera, second lighting system, and second controller.

* * * * *